(12) United States Patent
Yoshida

(10) Patent No.: US 7,498,970 B2
(45) Date of Patent: Mar. 3, 2009

(54) MONITOR

(75) Inventor: Takashi Yoshida, Nara (JP)

(73) Assignee: Panasonic Corporation, Osaka (JP)

( * ) Notice: Subject to any disclaimer, the term of this patent is extended or adjusted under 35 U.S.C. 154(b) by 27 days.

(21) Appl. No.: 11/575,243

(22) PCT Filed: Sep. 14, 2005

(86) PCT No.: PCT/JP2005/016952

§ 371 (c)(1),
(2), (4) Date: Mar. 14, 2007

(87) PCT Pub. No.: WO2006/030832

PCT Pub. Date: Mar. 23, 2006

(65) Prior Publication Data

US 2008/0030394 A1 Feb. 7, 2008

(30) Foreign Application Priority Data

Sep. 15, 2004 (JP) ............................. 2004-268615
Mar. 1, 2005 (JP) ............................. 2005-056484

(51) Int. Cl.
G01S 13/00 (2006.01)
(52) U.S. Cl. .............................. 342/70; 342/74; 342/81
(58) Field of Classification Search ............. 342/70–72, 342/74, 75, 118, 147, 81; 343/733, 767, 343/764, 795, 805, 806; 701/49
See application file for complete search history.

(56) References Cited

U.S. PATENT DOCUMENTS 4,961,075 A * 10/1990 Ward ......................... 342/140
5,424,952 A * 6/1995 Asayama ..................... 701/200
5,598,163 A * 1/1997 Cornic et al. .................. 342/70
5,654,715 A * 8/1997 Hayashikura et al. ......... 342/70
6,081,237 A * 6/2000 Sato et al. .................... 343/713
6,243,024 B1 * 6/2001 Yamabuchi et al. ......... 340/903

(Continued)

FOREIGN PATENT DOCUMENTS

JP          59-44103          3/1984

(Continued)

OTHER PUBLICATIONS

A planar loop sector antenna for WLAN card terminal Hiroyuki Uno; Saito, Y.; Ohta, G.-I.: Koyandgi, Y.; Eghwa, K.; Antennas and Propagation Society International Symposiun, 2004. IEEE vol. 2, Jun. 20-25, 2004 pp. 1971-1974 vol. 2.*

(Continued)

Primary Examiner—Thomas H Tarcza
Assistant Examiner—Peter M Bythrow
(74) Attorney, Agent, or Firm—RatnerPrestia

(57) ABSTRACT

A monitoring apparatus of the present application includes: a transmission antenna section that transmits a radio wave of single beam having a wide angle or alternatively a radio wave having a narrower (angular) range in a plurality of beam directions. A receiving antenna section receives the radio wave transmitted by the transmission antenna section and then reflected by a target. A beam switching instrument performs a switching operation such that power is fed to either a first power feed section or a second power feed section, which thereby controls the beam directions of the radio waves to monitor a specified area.

32 Claims, 27 Drawing Sheets

U.S. PATENT DOCUMENTS

| | | | |
|---|---|---|---|
| 6,452,533 B1 * | 9/2002 | Yamabuchi et al. | 342/70 |
| 6,452,534 B1 * | 9/2002 | Zoratti et al. | 342/70 |
| 6,492,949 B1 * | 12/2002 | Breglia et al. | 343/700 MS |
| 6,501,436 B1 * | 12/2002 | Saito et al. | 343/867 |
| 6,573,874 B1 * | 6/2003 | Saito et al. | 343/805 |
| 6,650,235 B2 * | 11/2003 | Shirai et al. | 340/435 |
| 6,665,592 B2 * | 12/2003 | Kodama | 701/1 |
| 6,690,329 B2 * | 2/2004 | Kodama | 343/713 |
| 6,750,810 B2 * | 6/2004 | Shinoda et al. | 342/149 |
| 6,853,329 B2 * | 2/2005 | Shinoda et al. | 342/149 |
| 6,856,277 B2 * | 2/2005 | Katayama et al. | 342/70 |
| 7,038,615 B2 * | 5/2006 | Brookner | 342/74 |
| 7,098,856 B2 * | 8/2006 | Okado | 343/702 |
| 7,123,183 B2 * | 10/2006 | Shouno et al. | 342/70 |
| 2002/0014988 A1 * | 2/2002 | Samukawa et al. | 342/70 |
| 2004/0121820 A1 * | 6/2004 | Unno et al. | 455/569.2 |
| 2005/0128132 A1 * | 6/2005 | Ziller et al. | 342/70 |
| 2007/0222662 A1 * | 9/2007 | Toennesen et al. | 342/27 |

FOREIGN PATENT DOCUMENTS

| | | |
|---|---|---|
| JP | 5-327335 | 12/1993 |
| JP | 11-220324 | 8/1999 |
| JP | 11-220325 | 8/1999 |
| JP | 11-266120 | 9/1999 |
| JP | 11-355030 | 12/1999 |
| JP | 2000-196335 | 7/2000 |
| JP | 2000-196340 | 7/2000 |
| JP | 3232162 | 9/2001 |
| JP | 2005-72915 | 3/2005 |

OTHER PUBLICATIONS

International Search Report for corresponding International PCT Application No. PCT/JP2005/016952 dated Oct. 25, 2005.

* cited by examiner

Fig.2(a) Perspective view
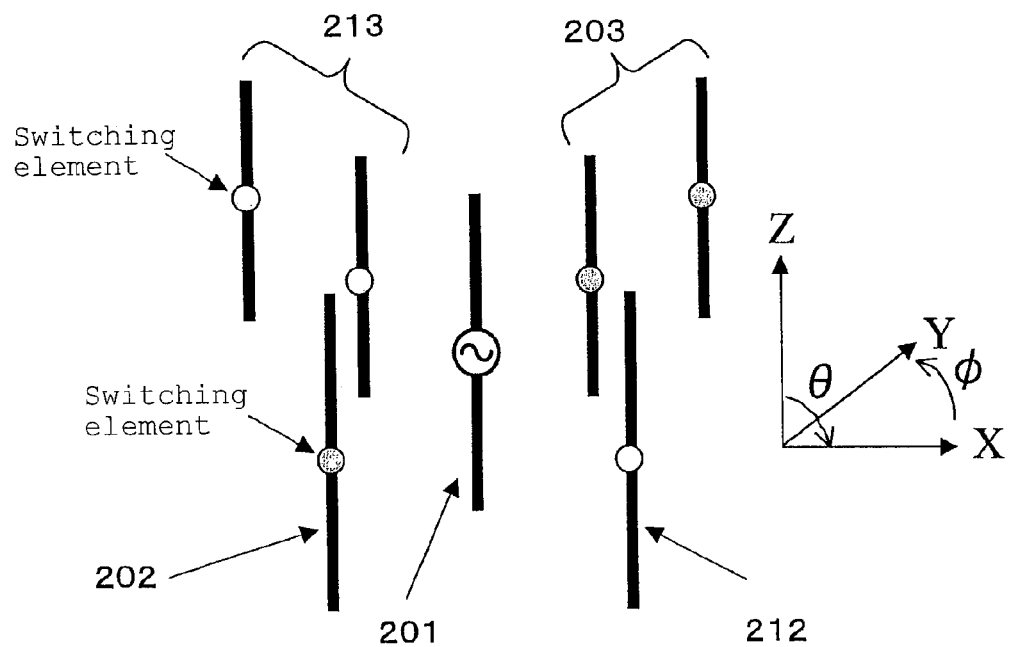
Fig.2(b) Plan view
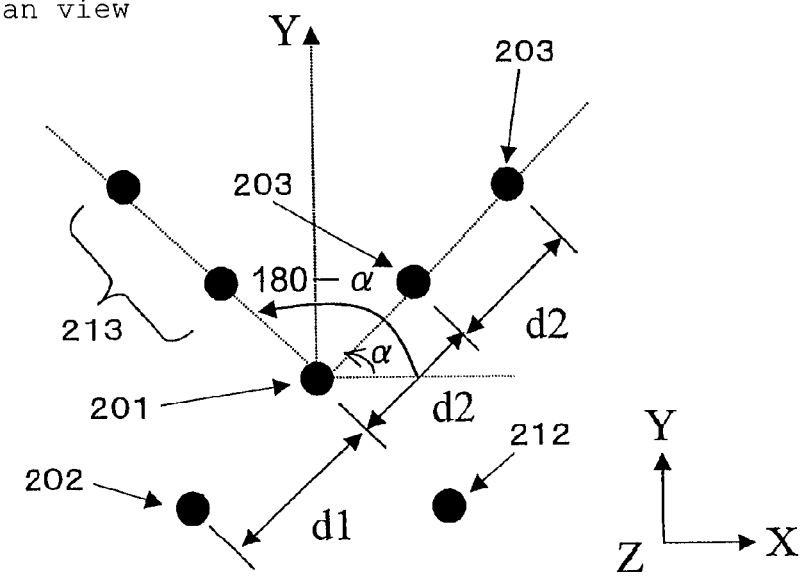

Fig.3(a) Horizontal (XY) plane
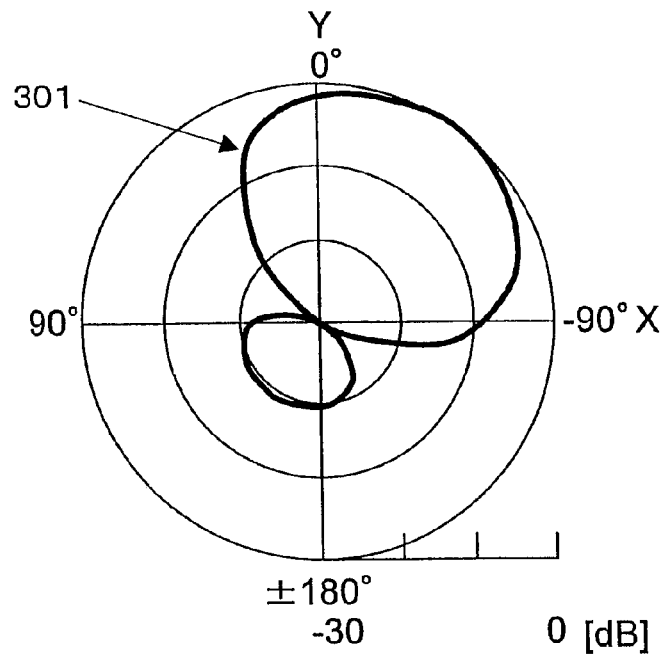
Fig.3(b) Vertical plane at azimuthal angle φ=50 degrees
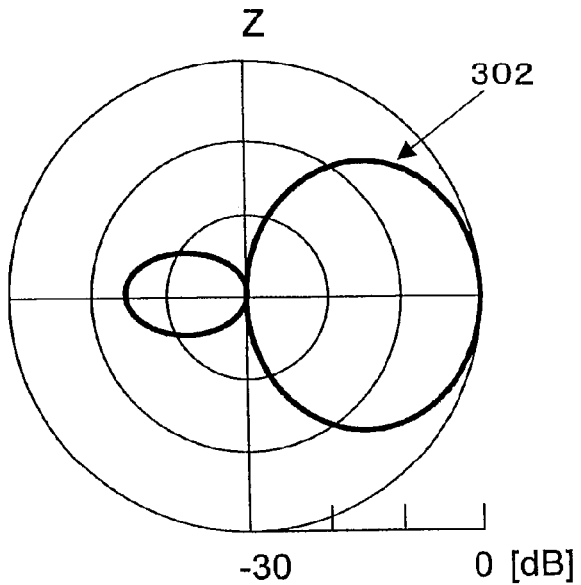

Fig.4(a) Horizontal (XY) plane
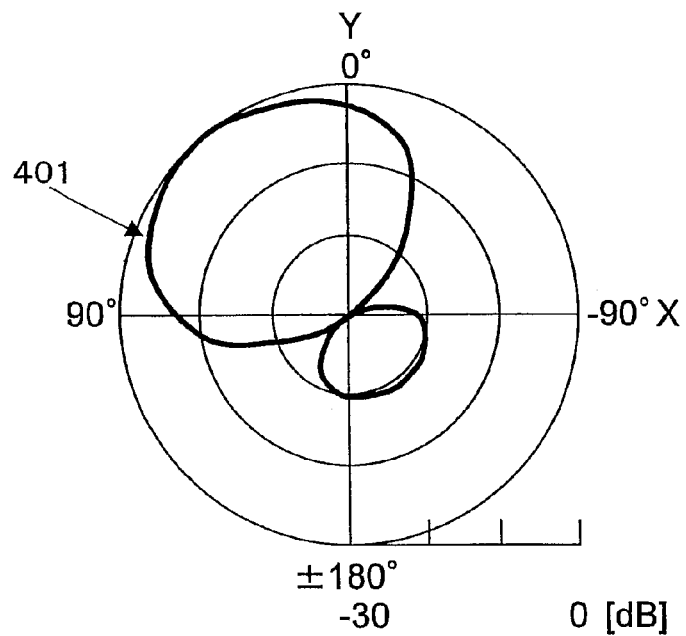
Fig.4(b) Vertical plane at azimuthal angle φ=130 degrees
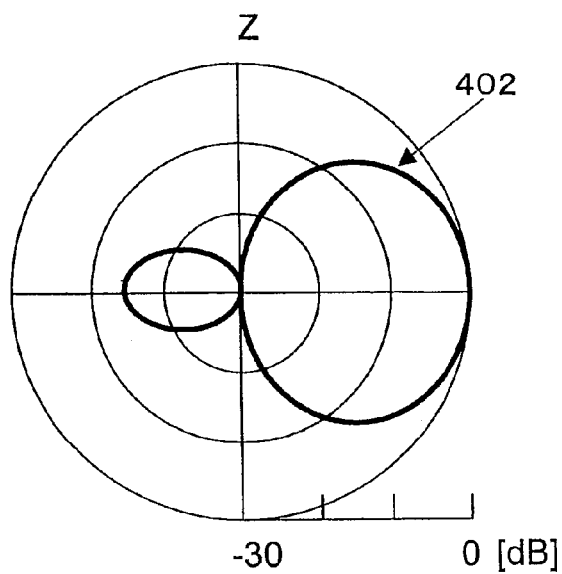

Fig.9(a) Perspective view
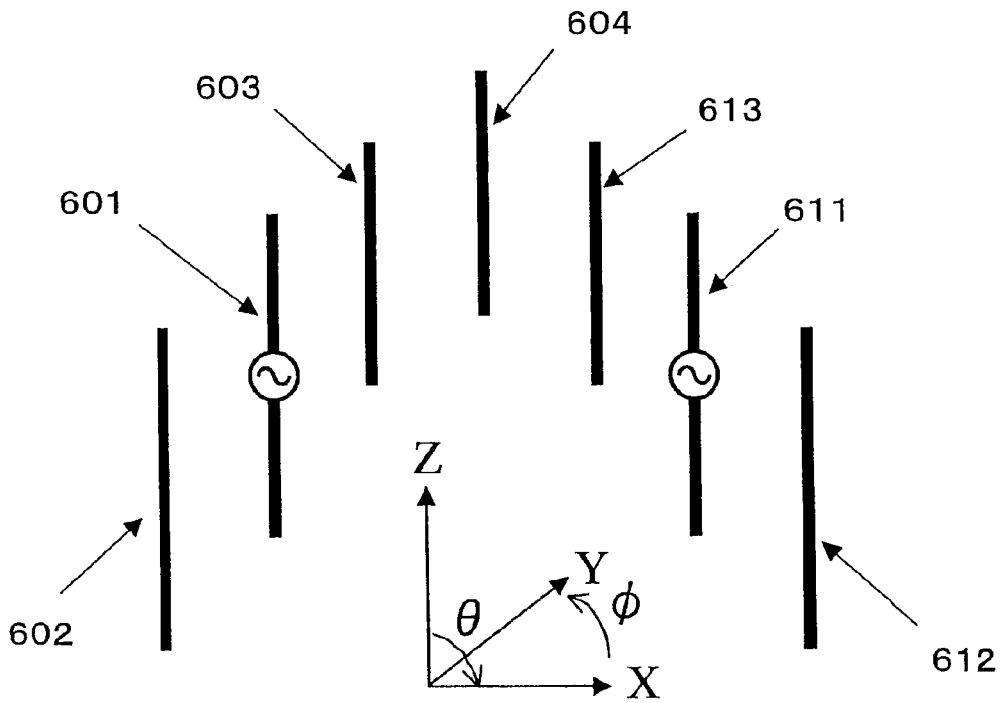
Fig.9(b) Plan view
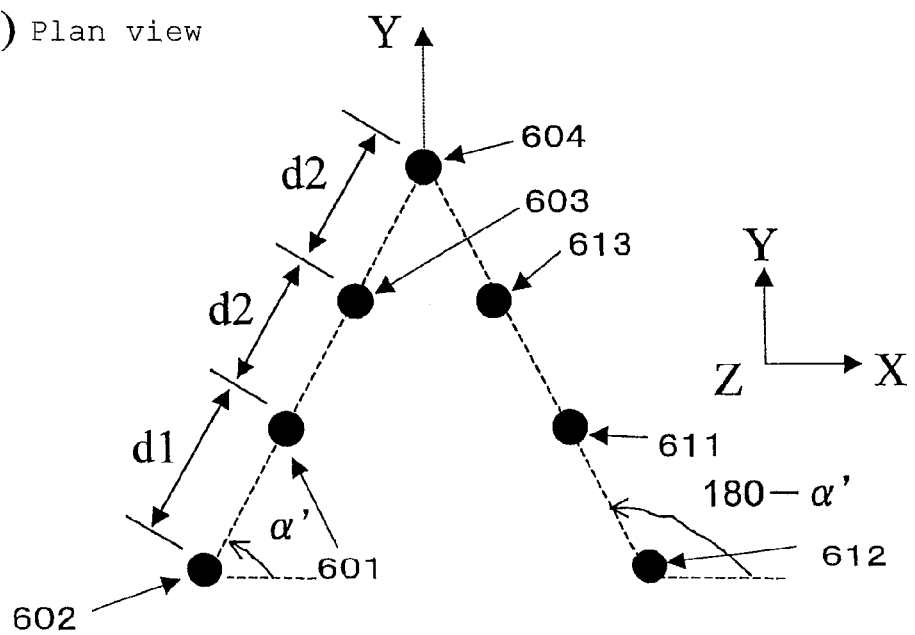

Fig.10(a) Horizontal (XY) plane
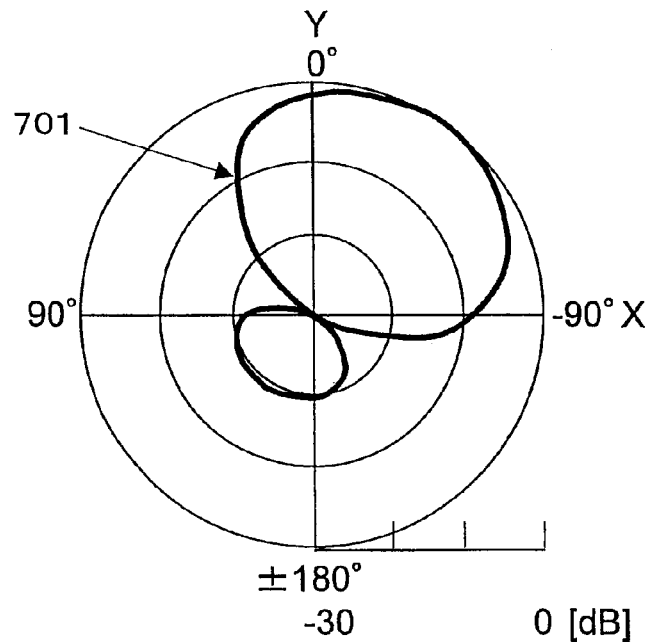
Fig.10(b) Vertical plane at azimuthal angle φ=50 degrees
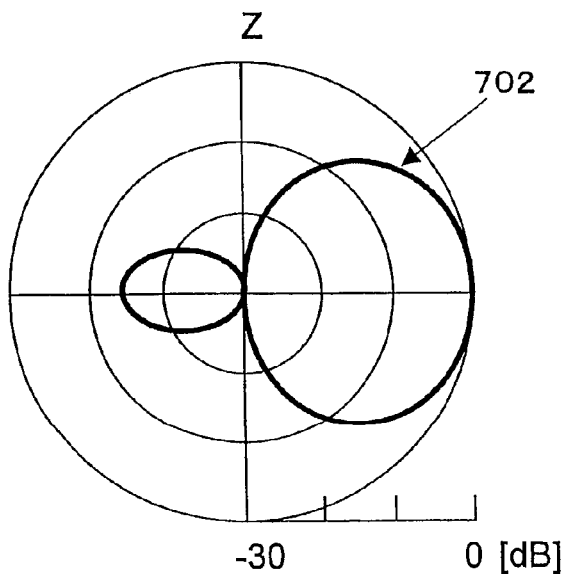

Fig.11(a) Horizontal (XY) plane
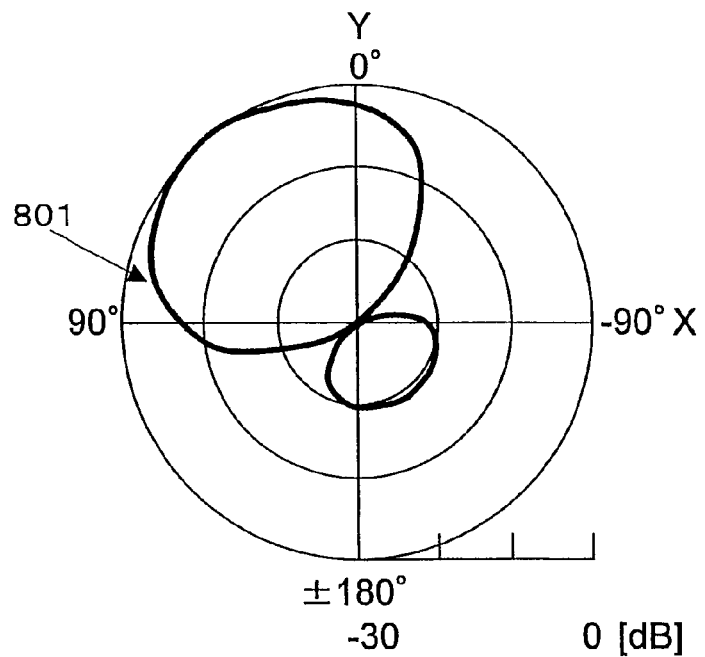
Fig.11(b) Vertical plane at azimuthal angle φ=130 degrees
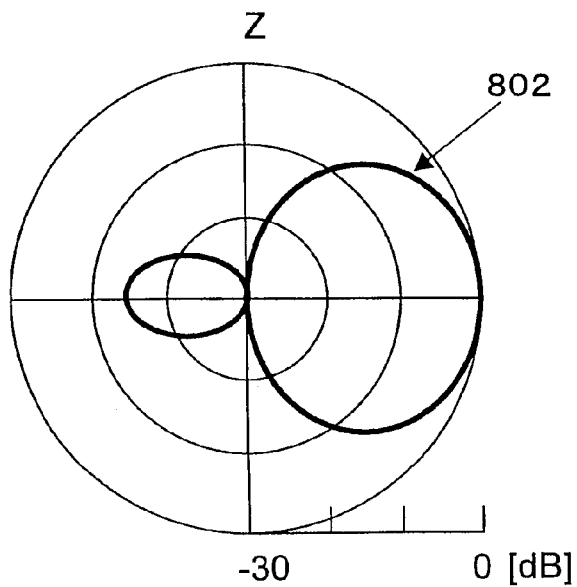

Fig.13(a) General configuration diagram
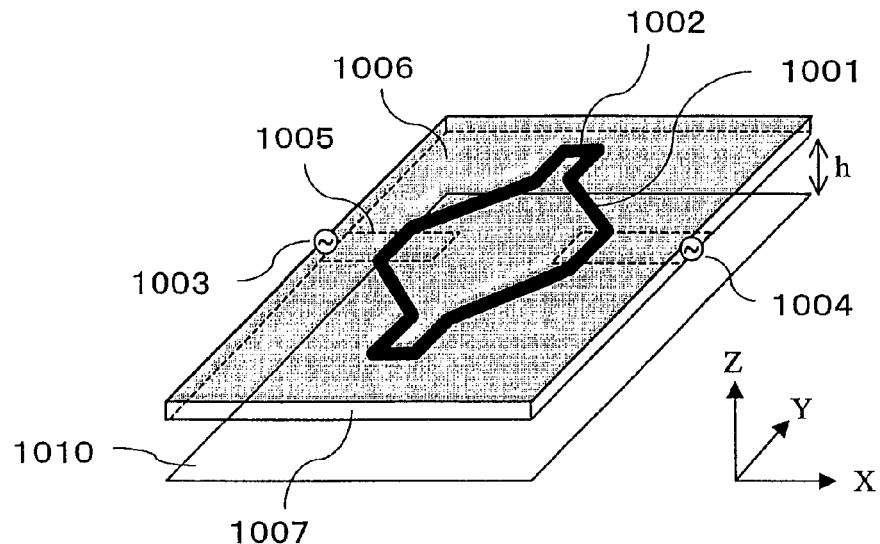
Fig.13(b)
Top view of dielectric substrate
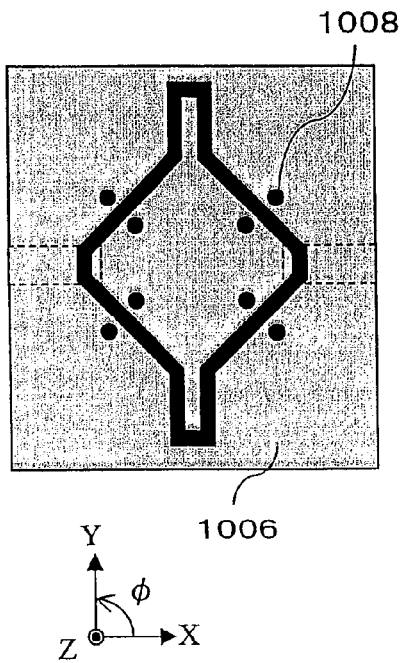
Fig.13(c)
Bottom view of dielectric substrate
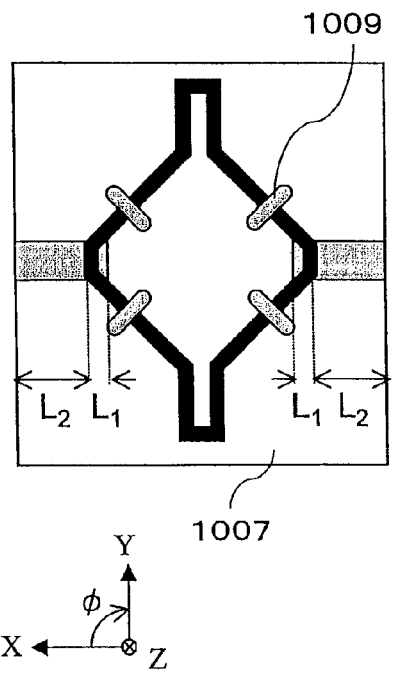

Two beam patterns

Sum and difference patterns

Angle error voltage

Display screen in car cabin

Detection scene in vehicle rearward direction

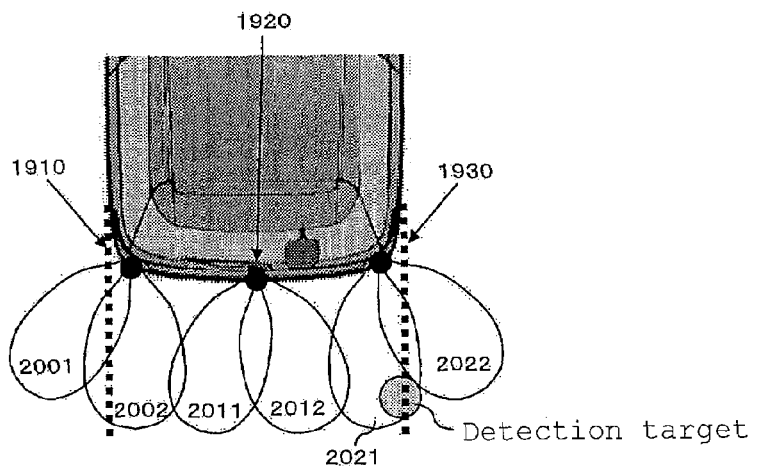
Fig.26(a) Warning is generated for unavoidable obstacle
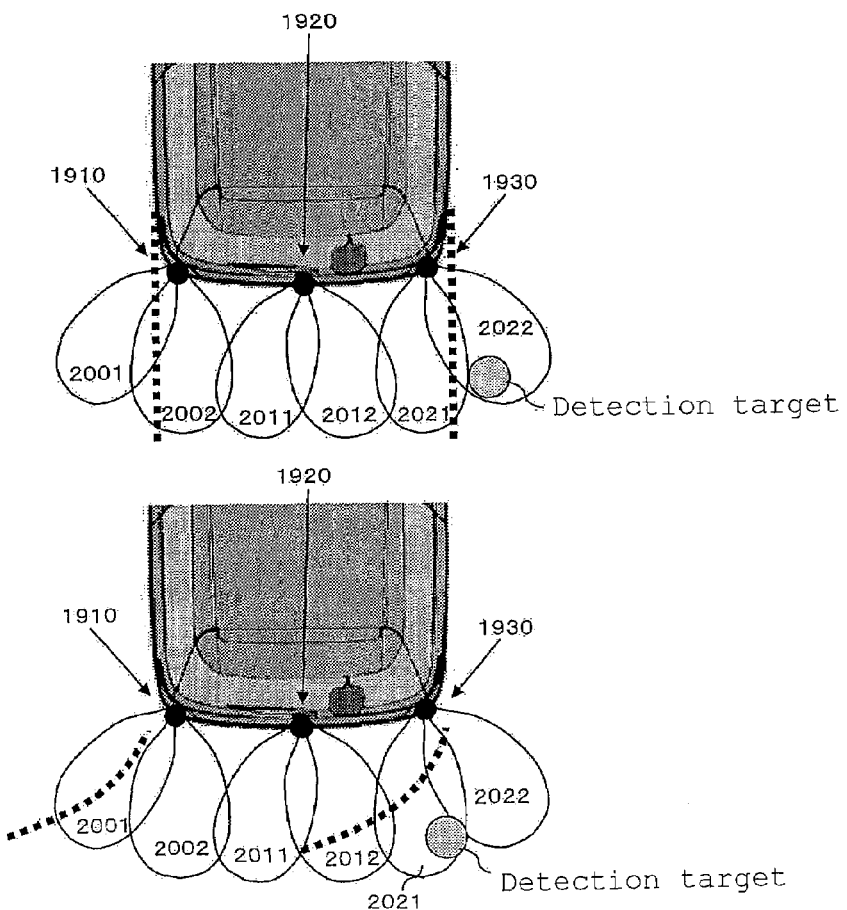
Fig.26(b) No warning is generated for avoidable obstacle

MONITOR

CROSS-REFERENCE TO RELATED APPLICATIONS

This application is a U.S. national phase application of PCT International Patent Application No. PCT/JP2005/16952, filed Sep. 14, 2005, claiming the benefit of priority of Japanese Patent Application Nos. 2004-268615 filed Sep. 15, 2004 and 2005-056484 filed Mar. 1, 2005, all of which are incorporated by reference herein in their entirety.

TECHNICAL FIELD

The present invention relates to a monitoring apparatus for sending out a radio wave, then receiving a reflected reflection signal, and thereby detecting a material body, a person, and the like in the surroundings.

BACKGROUND ART

In an example of a prior art vehicle surroundings monitoring apparatus for monitoring the surroundings of a vehicle, an ultrasonic sensor is attached at a corner of the front or the rear of the vehicle so that a surrounding obstacle is detected or its distance is measured. Then, in case of danger of contact, the situation is reported to the driver (see, for example, Japanese Patent Publication No. 3232162).

FIG. 27 is a plan view showing a prior art vehicle surroundings monitoring apparatus described in Japanese Patent Publication No. 3232162. In FIG. 27, ultrasonic detectors $3_{FR}$, $3_{FL}$, $3_{RR}$, $3_{RL}$, $3_{BR}$, and $3_{BL}$ are installed at the corners of the front or the rear of a vehicle body 1. Ultrasonic waves are transmitted in such timing that mutual interference is avoided. By virtue of this, a surrounding obstacle is detected, so that the distance to the obstacle is measured. Then, when the distance to the obstacle is reduced so that danger is expected, an alarm signal is outputted from an alarm unit.

Here, such ultrasonic sensors have a short detection distance and poor environmental resistance such as erroneous detection caused when raindrops are attached to the sensors. Thus, radar sensors employing radio waves also have begun to be adopted widely in vehicle surroundings monitoring apparatuses. A prior art radar apparatus for vehicle is installed in the front of a vehicle and used for measuring the car-to-car distance and the relative velocity to a vehicle located ahead by using an extremely narrow beam of 10 degrees or less, and thereby controlling the own vehicle. Thus, the monitoring area is limited to an extremely narrow and elongate region in front of the vehicle.

DISCLOSURE OF THE INVENTION

Nevertheless, since the detection (angular) range of a radar sensor is determined by the directivity of an antenna, a plurality of sensors need be arranged in order to cover a wider (angular) range. This causes the problem of an increase in the overall system cost.

FIG. 28 shows the attachment positions of radar sensors and their monitoring areas in a case that the radar sensor are used for monitoring the rearward direction of a vehicle without a gap. As such, a large number of radar sensors 2801-2806 are necessary.

Another method of covering a wide (angular) range is scanning. Nevertheless, this method requires mechanical rotation, and hence causes an extremely large cost increase. Yet another method is a phased array antenna in which the antenna lobe is rotated electronically. Nevertheless, in order to achieve a sharp convergence, a large number of phase-controlled active transmission/receiving elements are necessary. This causes comparatively high implementation cost.

That is, the monitoring of a wide (angular) range of vehicle surroundings by using radar sensors has the problem of extremely high cost.

The present invention solves the above-mentioned problem in the prior art. An object of the invention is to provide a monitoring apparatus capable of monitoring a wide (angular) range of vehicle surroundings or the like by using a small number of radar sensors or the like.

A first aspect of the present invention is a monitoring apparatus for being installed on a vehicle, sending out a radio wave, then receiving a radio wave generated by reflection of the radio wave, and thereby detecting a target including a material body and/or a human body, said apparatus comprising:

a transmission antenna section for sending out a radio wave having directivity of a predetermined (angular) range, or alternatively for sending out in different beam directions a radio wave having directivity of an (angular) range narrower than said predetermined (angular) range;

a receiving antenna section for receiving in each different beam direction the radio wave transmitted by said transmission antenna section and then reflected by said target;

a transmission section for transmitting to said transmission antenna section a signal to be sent out as said radio wave;

a receiving section to which the radio wave received by said receiving antenna section is transmitted as a signal from said receiving antenna section;

beam switching instrument which switches the beam direction sequentially when said receiving antenna section receives said radio wave in said each different beam direction, and which thereby controls a monitoring area; and a running information storing section for storing running state information of said vehicle, wherein said receiving antenna section includes a first power feed section and a second power feed section, and wherein on the basis of said running state information stored in said running information storing section, said beam switching instrument performs switching such that power is fed to either said first power feed section or said second power feed section.

A second aspect of the present invention is a monitoring apparatus according to the first aspect of the present invention, wherein when said transmission antenna section sends out said radio wave in different beam directions, said beam switching instrument which sequentially switches the beam direction of the transmitted radio wave and thereby controls the monitoring area.

A third aspect of the present invention is a monitoring apparatus according to the second aspect of the present invention, comprising transmission and reception switching instrument which switches a signal transmitted from said transmission section and a signal transmitted to said receiving section, wherein said receiving antenna section serves also as said transmission antenna section, while transmission or reception of the radio wave is switched by said transmission and reception switching instrument.

A fifth aspect of the present invention is a monitoring apparatus according to the first aspect of the present invention, wherein said receiving antenna section includes a reflector plate and a rectangular antenna element parallel to said reflector plate, and wherein said rectangular antenna element retains said first power feed section and said second power feed section at a pair of two opposing corners thereof and detour elements at the other opposing corners.

A sixth aspect of the present invention is a monitoring apparatus according to the fifth aspect of the present invention, wherein said rectangular antenna element has a substantially square shape, while one side thereof has a length of substantially ⅓ of a wavelength of an operating frequency, and while each of said detour elements has a length of substantially ¼ of the wavelength of the operating frequency.

A seventh aspect of the present invention is a monitoring apparatus according to the fifth aspect of the present invention, wherein said rectangular antenna element is a slot loop antenna having a slot section where a conductor on a conductor face of a dielectric substrate is removed in a rectangular shape, while said detour elements are detour slot parts located at a pair of opposing corners of said slot section, and wherein each of the other pair of opposing corners of said slot section receives power fed by electromagnetic coupling from an end of one of microstrip lines formed on a surface opposite to the conductor face of said dielectric substrate, while the other end of one of said microstrip lines is said first power feed section, and while the other end of the other of said microstrip lines is said second power feed section.

An eighth aspect of the present invention is a monitoring apparatus according to the seventh aspect of the present invention, wherein the surface opposite to the conductor face of said dielectric substrate faces said reflector plate.

A ninth aspect of the present invention is a monitoring apparatus according to the first aspect of the present invention, further comprising a first target position determination section for determining a distance to said target on the basis of the signal transmitted to said receiving section, then determining a direction toward said target on the basis of a value obtained when a difference of amplitudes of two signals among a plurality of signals corresponding to a plurality of radio waves received from said different beam directions is normalized by a sum of the amplitudes of said two signals, and thereby determining a position of said target on the basis of said distance and said direction toward said target.

A tenth aspect of the present invention is a monitoring apparatus according to the first aspect of the present invention, wherein at least said transmission antenna section and said receiving antenna section are provided in a front central part and/or a rear central part of said vehicle, and wherein among said different beam directions, one is directed leftward of said vehicle, while another one is directed rightward of said vehicle.

An eleventh aspect of the present invention is a monitoring apparatus according to the first aspect of the present invention, wherein at least said transmission antenna section and said receiving antenna section are provided within a side mirror of said vehicle, and wherein among said different beam directions, one is directed forward of said vehicle, while another one is directed rearward of said vehicle.

A twelfth aspect of the present invention is a surroundings monitoring system wherein a plurality of said monitoring apparatuses according to the first aspect of the present invention are provided and aligned so that a larger region becomes a monitoring area in comparison with the case that said monitoring apparatus is employed in stand-alone.

A thirteenth aspect of the present invention is a surroundings monitoring system according to the twelfth aspect of the present invention, wherein a timing that all of a plurality of said monitoring apparatuses monitor the same predetermined side and a timing that all of a plurality of said monitoring apparatuses monitor the side opposite to said same predetermined side are switched and controlled in time sharing.

A fourteenth aspect of the present invention is a surroundings monitoring system according to the twelfth aspect of the present invention, comprising a second target position determination section of determining a position of a target on the basis of a distance from one monitoring apparatus, among a plurality of said monitoring apparatuses having been aligned, to said target determined by said one monitoring apparatus and a distance from another monitoring apparatus to said target determined by said another monitoring apparatus arranged distant from said one monitoring apparatus.

A fifteenth aspect of the present invention is a monitoring control method in a vehicle-installed monitoring apparatus of sending out a radio wave, then receiving a radio wave generated by reflection of the radio wave, and thereby detecting a target including a material body and/or a human body, wherein said method includes the step of determining which monitoring area among a plurality of monitoring areas that can be monitored when a beam direction of the radio wave is switched should be activated at which timing on the basis of running state information of said vehicle, and of thereby controlling the monitoring area.

The present invention provides a monitoring apparatus capable of monitoring a wide (angular) range of vehicle surroundings or the like by using a small number of radar sensors or the like.

BRIEF DESCRIPTION OF THE DRAWINGS

FIG. 2(a) is a perspective view showing the configuration of an antenna according to Embodiment 1 of the present invention.

FIG. 2(b) is a plan view showing the configuration of an antenna according to Embodiment 1 of the present invention.

FIG. 3(a) is a diagram showing a radiating pattern in a horizontal plane of an antenna according to Embodiment 1 of the present invention.

FIG. 3(b) is a diagram showing a radiating pattern in a vertical plane at an azimuthal angle $\phi=50$ degrees of an antenna according to Embodiment 1 of the present invention.

FIG. 4(a) is a diagram showing a radiating pattern in a horizontal plane of an antenna according to Embodiment 1 of the present invention.

FIG. 4(b) is a diagram showing a radiating pattern in a vertical plane at an azimuthal angle $\phi=130$ degrees of an antenna according to Embodiment 1 of the present invention.

FIG. 9(a) is a perspective view showing the configuration of an antenna according to Embodiment 2 of the present invention.

FIG. 9(b) is a plan view showing the configuration of an antenna according to Embodiment 2 of the present invention.

FIG. 10(a) is a diagram showing a radiating pattern in a horizontal plane of an antenna according to Embodiment 2 of the present invention.

FIG. 10(b) is a diagram showing a radiating pattern in a vertical plane at an azimuthal angle φ=50 degrees of an antenna according to Embodiment 2 of the present invention.

FIG. 11(a) is a diagram showing a radiating pattern in a horizontal plane of an antenna according to Embodiment 2 of the present invention.

FIG. 11(b) is a diagram showing a radiating pattern in a vertical plane at an azimuthal angle φ=130 degrees of an antenna according to Embodiment 2 of the present invention.

FIG. 13(a) is a general configuration diagram showing the configuration of an antenna having yet another configuration according to Embodiment 2 of the present invention.

FIG. 13(b) is a top view showing the configuration of a dielectric substrate of an antenna having yet another configuration according to Embodiment 2 of the present invention.

FIG. 13(c) is a bottom view showing the configuration of a dielectric substrate of an antenna having yet another configuration according to Embodiment 2 of the present invention.

FIG. 26(a) is a diagram showing a state that a detected target cannot be avoided in a vehicle surroundings monitoring system according to Embodiment 5 of the present invention.

FIG. 26(b) is a diagram showing a state that a detected target can be avoided in a vehicle surroundings monitoring system according to Embodiment 5 of the present invention.

Figure 1:
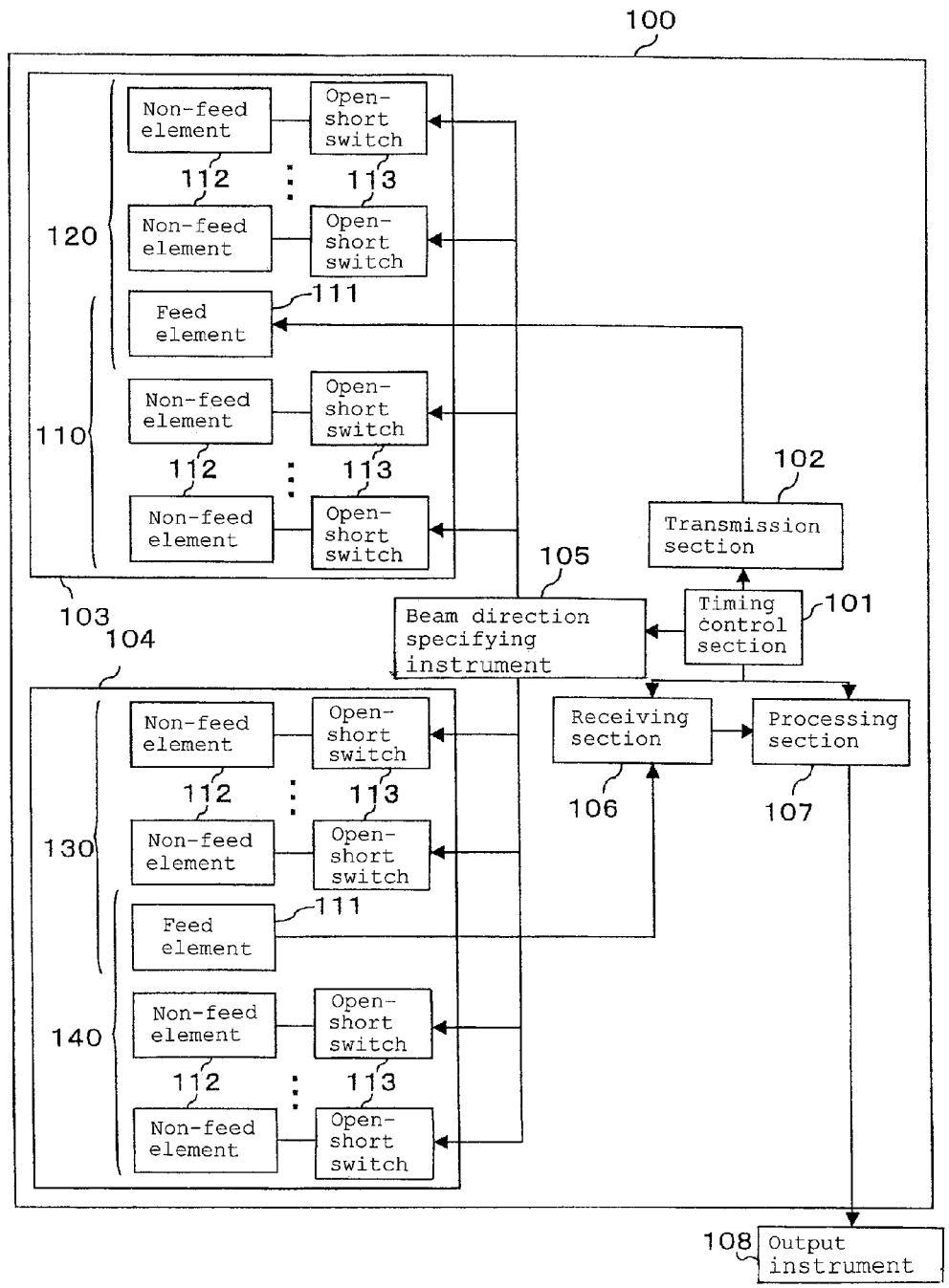
FIG. 1 is a block configuration diagram of a vehicle surroundings monitoring apparatus according to Embodiment 1 of the present invention.

DESCRIPTION OF REFERENCE NUMERALS d1 Distance between radiating element and reflecting element d2 Distance between radiating element and waveguide element and distance between waveguide elements 101 Timing control section
102 Transmission section
103 Transmission antenna
104 Receiving antenna
106 Receiving section
107 Processing section
201 Radiating element
202, 212 Reflecting element
203, 213 Waveguide element
601, 611 Radiating element
602, 612 Reflecting element
603, 604, 613 Waveguide element
1970 Central control arithmetic operation section
1971 Central timing control section
1972 Central processing section
1980 Running status information storing section
1981 Vehicle speed sensor
1982 Steering angle sensor
1990 Display section 100, 1100, 1700, 1710, 1800, 1810, 1820, 1830, 1910, 1920, 1930 Vehicle surroundings monitoring apparatus
  1101, 1102, 1701, 1702, 1711, 1712, 1801, 1802, 1811, 1812, 1821, 1822, 1831, 1832, 2001, 2002, 2011, 2012, 2021, 2022 Monitoring area
  2200 Transmitting module
  2201 Timing control section
  2202 Transmission section
  2203 Transmission antenna
  2210 Receiving module
  2211 Timing control section
  2212 Power feed changing switch
  2513 Receiving antenna section

BEST MODE FOR CARRYING OUT THE INVENTION

Embodiments of the present invention are described below with reference to the drawings.

Embodiment 1

FIG. 1 is a block configuration diagram of a vehicle surroundings monitoring apparatus according to Embodiment 1 of the present invention.

In FIG. 1, a vehicle surroundings monitoring apparatus 100 comprises: a timing control section 101; a transmission section 102 of transmitting a radio wave; a transmission antenna 103 having a plurality of beams; a receiving antenna 104; beam direction specifying instrument 105 which switches the beam direction of the antenna; a receiving section 106 of receiving a reflection signal; and a processing section 107. The transmission section 102, the beam direction specifying instrument 105, the receiving section 106, and the processing section 107 are controlled on the basis of timing signals from the timing control section 101. Here, the vehicle surroundings monitoring apparatus 100 is an example of the monitoring apparatus of the present invention. The transmission antenna 103 and the receiving antenna 104 are examples of the transmission antenna section and the receiving antenna section of the present invention, respectively. Further, the beam direction specifying instrument 105 is an example of the beam switching instrument of the present invention.

The transmission antenna 103 includes a first antenna 110 and a second antenna 120 each provided with one feed element 111 and a plurality of non-feed elements. The first antenna 110 and the second antenna 120 share the feed element 111.

The receiving antenna 104 has the same configuration as the transmission antenna 103, and includes a first antenna 130 and a second antenna 140. The first antenna 130 and the second antenna 140 share the feed element 111.

Next, the operation of the vehicle surroundings monitoring apparatus 100 of the present Embodiment 1 is described below with reference to FIG. 1.

Each non-feed element 112 includes an open-short switch 113. Then, the beam direction specifying instrument 105 performs control such that in the transmission antenna 103, when the open-short switches 113 of all the non-feed elements 112 owned by the first antenna 110 are open, the open-short switches of all the non-feed elements 112 owned by the second antenna 120 should be short-circuited, and that when the open-short switches of all the non-feed elements 112 owned by the first antenna 110 are short-circuited, the open-short switches of all the non-feed elements 112 owned by the second antenna 120 should be open. The beam direction specifying instrument 105 performs similar control also in the receiving antenna 104.

On the basis of timing signals from the timing control section 101, the beam direction specifying instrument 105 controls the open-short switch 113 of each non-feed element 112 such that a beam should be formed in a predetermined direction.

Similarly, on the basis of a timing signal, the signal transmitted from the transmission section 102 is sent out from the transmission antenna 103. When a detection target is present in the surroundings, the sent-out signal is reflected by the detection target. Here, the detection target indicates a vehicle, a material body, or a human body located in the surroundings of a vehicle in which this vehicle surroundings monitoring apparatus 100 is installed.

The reflection signal from such a detection target is transmitted to the receiving section 106 through the receiving antenna 104 and then processed in the processing section 107, so that information on the presence or absence of a detection target, the distance to the detection target, and the speed of the detection target is obtained. Then, output instrument 108 connected to the vehicle surroundings monitoring apparatus 100 outputs such information in the form of display, voice output, or the like.

Next, the configuration of the transmission antenna 103 and the receiving antenna 104 of the vehicle surroundings monitoring apparatus 100 of the present Embodiment 1 is described below for the case of a configuration based on a Yagi-Uda array antenna.

FIG. 2 is a configuration diagram of an antenna employing a configuration based on a Yagi-Uda array antenna. FIG. 2(a) is a perspective view, while FIG. 2(b) is a top plan view. The following description is given for the case that the operating frequency of the antenna is 24 GHz. Further, coordinate axes are defined as shown in FIG. 2, for convenience of description.

The antenna shown in FIG. 2 includes: a first Yagi-Uda array antenna composed of a radiating element 201, a reflecting element 202, and a plurality of waveguide elements 203; and a second Yagi-Uda array antenna composed of a radiating element 201, a reflecting element 212, and a plurality of waveguide elements 213. As shown in FIG. 2, these two Yagi-Uda array antennas share the radiating element 201, and are arranged around the radiating element 201 on the Y-axis, in opposite and tilted directions with respect to the Y-axis. As for the tilt relative to the Y-axis, when the X-axis is adopted as the reference, the first Yagi-Uda array antenna is arranged along a direction tilted from the X-axis direction by an angle $\phi = \alpha$. Further, the second Yagi-Uda array antenna is arranged along a direction tilted from the X-axis direction by an angle $\phi = 180 - \alpha$.

The radiating element 201 is a half wavelength dipole antenna having a length of 6 mm. Each of the reflecting elements 202 and 212 is a line-shaped element having a length of 6 mm arranged at a position of distance d1 from the radiating element 201. A plurality of the waveguide elements 203 and 213 are arranged at a position of distance d2 from the radiating element 201. These intervals are d2 each. At that time, the length of the waveguide elements 203 and 213 is set to be 5 mm each.

As shown in FIG. 2(b), the reflecting element 202 and a plurality of the waveguide elements 203 are arranged on a straight line in parallel to the radiating element 201, and thereby constitute the first Yagi-Uda array antenna. Similarly, the reflecting element 212 and a plurality of the waveguide elements 213 are arranged on a straight line in parallel to the radiating element 201, and thereby constitute the second Yagi-Uda array antenna. Here, the direction of the first Yagi-Uda array antenna in which the reflecting element 202, the radiating element 201, and a plurality of the waveguide elements 203 are arranged on a straight line is an example of the predetermined direction of the present invention. Further, the direction of the second Yagi-Uda array antenna in which the reflecting element 212, the radiating element 201, and a plurality of the waveguide elements 213 are arranged on a straight line is an example of the direction different from the predetermined direction of the present invention.

Each of the reflecting elements 202 and 212 and the waveguide elements 203 and 213 is provided with a switching element using a PIN diode or the like in the center of the element. Thus, when a forward bias is applied to the PIN diode so that the switching element is turned ON, each of these reflecting elements and waveguide elements operates as a reflecting element or a waveguide element. When a reverse bias is applied to the PIN diode so that the switching element is turned OFF, a state is established that each reflecting element or waveguide element is separated at the center, so that the element does not operate as a reflecting element or a waveguide element. Here, these switching elements correspond to the open-short switches 113 shown in FIG. 1.

The correspondence relation of the directivity of the first and the second antennas that constitute the transmission antenna 103 and the receiving antenna 104 shown in FIG. 1 with the direction of the above-mentioned Yagi-Uda array antenna is as follows. That is, the first antenna 110 of the transmission antenna 103 and the first antenna 130 of the receiving antenna 104 have the same directivity (see FIGS. 3(a) and 3(b)), and each of these is constructed from the first Yagi-Uda array antenna shown in FIGS. 2(a) and 2(b). Further, the second antenna 120 of the transmission antenna 103 and the second antenna 140 of the receiving antenna 104 have the same directivity (see FIGS. 4(a) and 4(b)), and each of these is constructed from the second Yagi-Uda array antenna shown in FIGS. 2(a) and 2(b).

Next, the operation is described below for the antenna having the configuration shown in FIG. 2.

Switching control is performed such that when the switching elements mounted in the element centers of the reflecting element 202 and the waveguide elements 203 constituting the first Yagi-Uda array antenna are turned ON, the switching elements mounted in the element centers of the reflecting element 212 and the waveguide elements 213 constituting the second Yagi-Uda array antenna should be turned OFF. Similarly, switching control is performed such that when the switching elements mounted in the element centers of the reflecting element 212 and the waveguide elements 213 constituting the second Yagi-Uda array antenna are turned ON, the switching elements mounted in the element centers of the reflecting element 202 and the waveguide elements 203 constituting the first Yagi-Uda array antenna should be turned OFF. When the states of the switching elements are switched as described here, the first Yagi-Uda array antenna and the second Yagi-Uda array antenna can be switched with each other. Thus, the direction of the main beam can be switched. Here, an example of the "different beam directions" of the present invention is that the directions of main beams are different when attention is focused on the directions of main beams.

FIG. 3 is a diagram showing directivity in a case that the first Yagi-Uda array antenna is solely operated that is located at $\phi$=50 degrees which is tilted from the Y-axis direction by 40 degrees. FIG. 3(a) shows directivity in the horizontal (XY) plane. FIG. 3(b) shows directivity in the vertical plane at an azimuthal angle $\phi$=50 degrees.

As a result of the switching control in the beam direction specifying instrument 105 described above, at the timing of ON (or OFF) of the first antenna 110 of the transmission antenna 103, the first antenna 130 of the receiving antenna 104 goes ON (or OFF). After that, at the timing of ON (or OFF) of the second antenna 120 of the transmission antenna 103, the second antenna 140 of the receiving antenna 104 goes ON (or OFF). As such, switches sequentially the antenna to be turned ON In FIG. 3(a), directivity 301 indicates the directivity of the vertically polarized wave (E$\theta$) component. This shows that a main beam is obtained that is tilted in the direction of an azimuthal angle $\phi$=50 degrees.

Further, in FIG. 3(b), similarly to the directivity 301, directivity 302 indicates the directivity of the vertically polarized wave (E$\theta$) component. This shows that the main beam is directed in a horizontal direction.

FIG. 4 is a diagram showing directivity in a case that the second Yagi-Uda array antenna is solely operated that is located at $\phi$=130 degrees which is tilted from the Y-axis direction by 40 degrees toward the direction opposite to the first Yagi-Uda array antenna. FIG. 4(a) shows directivity in the horizontal (XY) plane. FIG. 4(b) shows directivity in the vertical plane at an azimuthal angle $\phi$=+130 degrees.

In FIG. 4(a), directivity 401 indicates the directivity of the vertically polarized wave (E$\theta$) component. This shows that a main beam is obtained that is tilted in the direction of an azimuthal angle $\phi$=130 degrees.

Further, in FIG. 4(b), similarly to the directivity 401, directivity 402 indicates the directivity of the vertically polarized wave (E$\theta$) component. This shows that the main beam is directed in a horizontal direction.

Figure 5A:
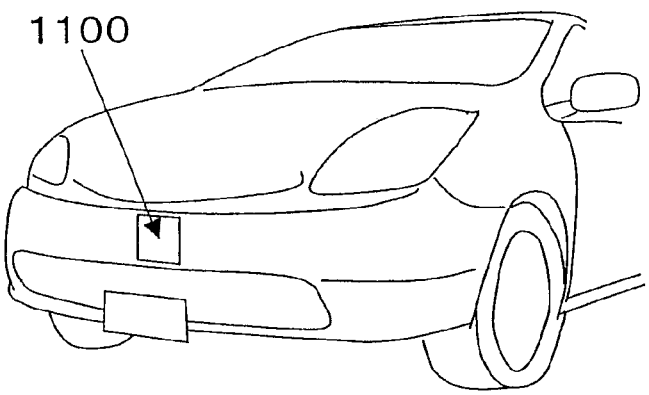
FIG. 5(a) is a diagram showing an example of arrangement of a vehicle surroundings monitoring apparatus according to Embodiment 1 of the present invention.
Figure 5B:
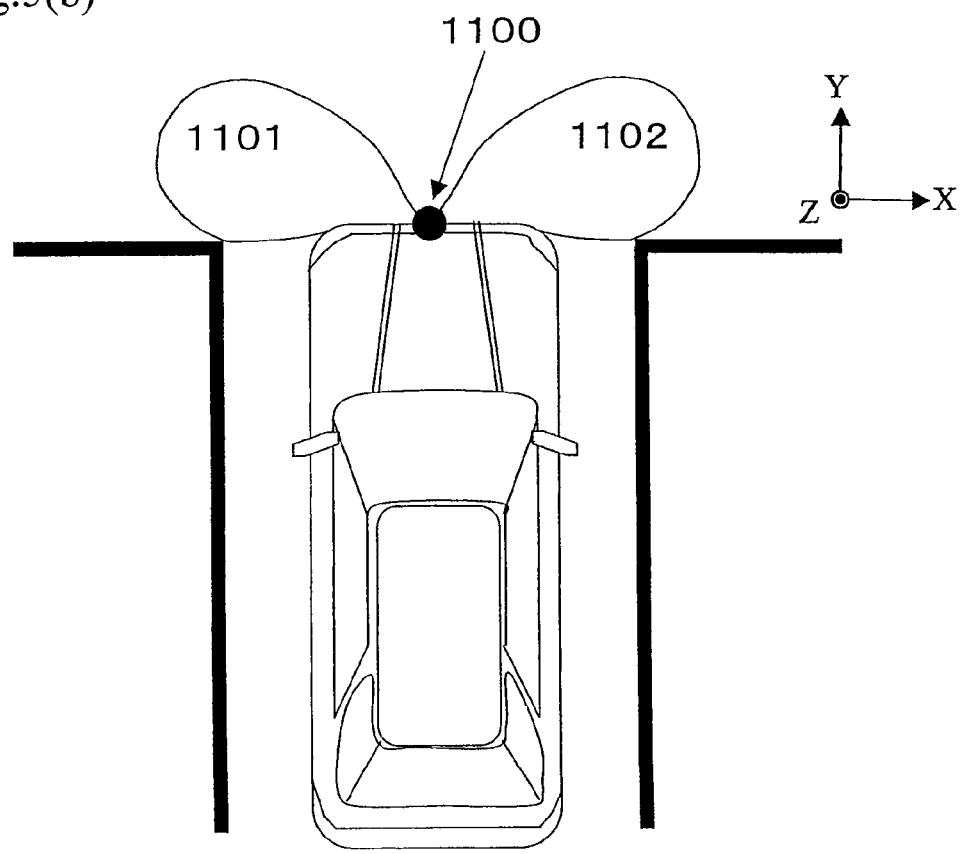
FIG. 5(b) is a diagram showing monitoring areas of a vehicle surroundings monitoring apparatus according to Embodiment 1 of the present invention.

FIG. 5 is a diagram showing an example of arrangement and monitoring areas of a vehicle surroundings monitoring apparatus according to Embodiment 1 of the present invention. FIG. 5(a) is a diagram showing the arrangement of a vehicle surroundings monitoring apparatus. FIG. 5(b) is a diagram showing its monitoring areas viewed from the above.

In FIG. 5(a), a vehicle surroundings monitoring apparatus 1100 is installed near the center of the front part of a vehicle, for example, inside a bumper composed of resin and hence transmitting radio waves, in such a manner that the Z-axis in FIG. 2 should be perpendicular to the ground surface and that the Y-axis should be in the forward direction of the vehicle. Here, the vehicle surroundings monitoring apparatus 1100 is the same as the vehicle surroundings monitoring apparatus 100 shown in FIG. 1.

Further, the beam of the antenna is tilted as largely as possible relative to the Y-axis direction ($\phi$=90 degrees), that is, tilted into a state that the azimuthal angle $\phi$ should approach 0 or 180 degrees as much as possible. By virtue of this, two monitoring areas consisting of a monitoring area 1101 and a monitoring area 1102 as shown in FIG. 5(b) can be monitored using one vehicle surroundings monitoring apparatus 1100. This permits monitoring of short-distance regions in the right and left directions of the vehicle when the vehicle runs through a blind crossing, a blind T junction, or the like.

According to this configuration, using merely one vehicle surroundings monitoring apparatus, the (necessity of) entering of a vehicle into the crossing, the T junction, or the like is minimized, while the check of approaching vehicles, bicycles, and passersby is assisted.

In the above-mentioned description, the vehicle surroundings monitoring apparatus has been arranged at the position shown in FIG. 5. However, the entire configuration of the vehicle surroundings monitoring apparatus 100 shown in FIG. 1 need not be arranged at the position shown in FIG. 5. It is sufficient that only the transmission antenna 103 and the receiving antenna 104 are arranged at the position of FIG. 5. The other components of the vehicle surroundings monitoring apparatus 100 may be arranged at other positions of the vehicle.

Further, in the configuration of the vehicle surroundings monitoring apparatus 100 shown in FIG. 1 of the present Embodiment 1, the beam of the transmission antenna 103 has been switched similarly to the case of the receiving antenna 104. However, the transmitting side may be constructed from an arbitrary antenna such as a patch antenna.

Figure 6:
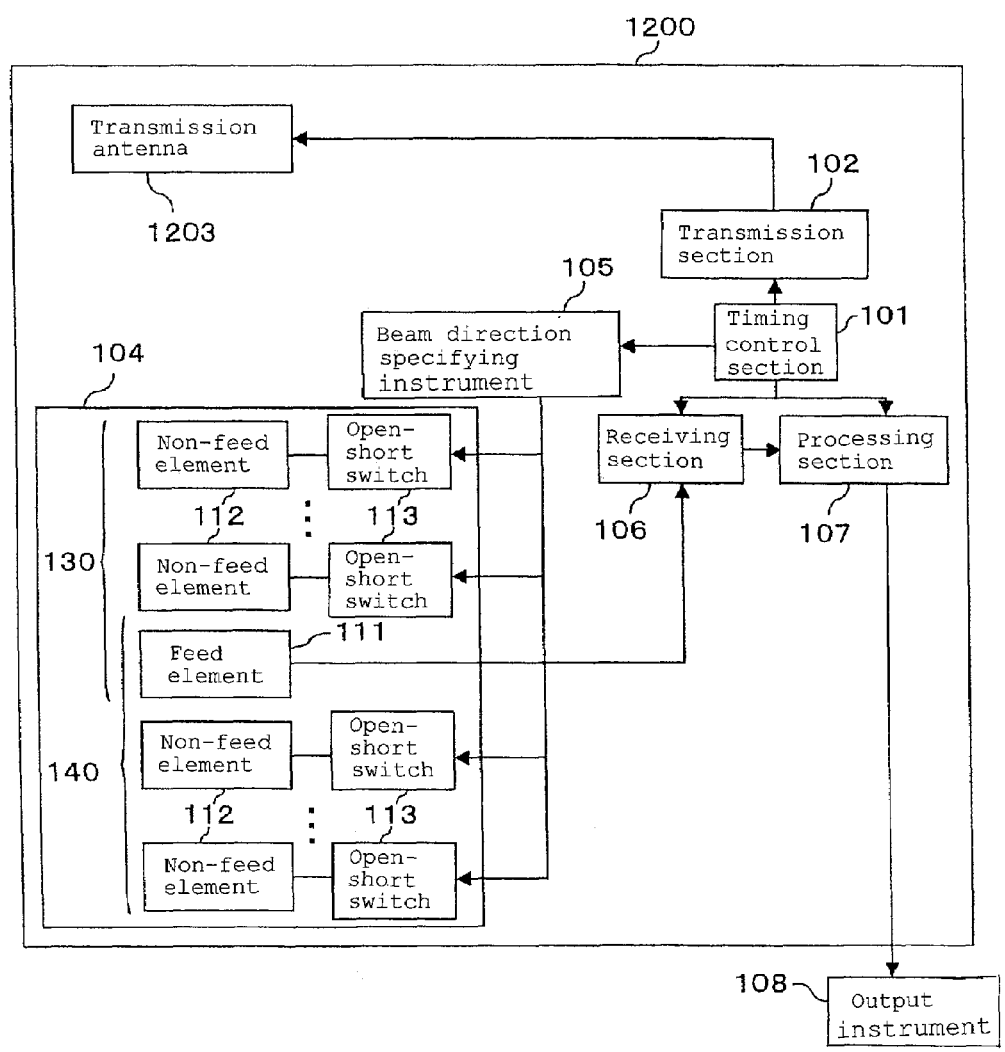
FIG. 6 is a block configuration diagram of a vehicle surroundings monitoring apparatus having another configuration according to Embodiment 1 of the present invention.

FIG. 6 is a configuration diagram of a vehicle surroundings monitoring apparatus 1200 in a case that the transmitting side is constructed from a patch antenna. The only difference is that the part of the transmission antenna 103 of the vehicle surroundings monitoring apparatus 100 shown in FIG. 1 is replaced by a transmission antenna 1203. The transmission antenna 1203 is a patch antenna having a wide directivity. Here, like components to FIG. 1 are designated by like numerals.

The radio wave sent out from the transmission antenna 1203 shown in FIG. 6 is an example of the "radio wave having directivity of a predetermined (angular) range" of the present invention. The radio wave in a plurality of directions sent out from the transmission antenna 103 of the vehicle surroundings monitoring apparatus 100 shown in FIG. 1 is an example of the "radio wave having directivity of an (angular) range narrower than said predetermined (angular) range" and the radio wave "sent out in different beam directions".

In FIG. 6, the signal transmission (angular) range of the transmission antenna 1203 is an (angular) range including both of the region monitored using the beam direction of the first antenna 130 and the region monitored using the beam direction of the second antenna 140. As such, it is sufficient that the antenna on the transmitting side is an antenna capable of sending out a radio wave over an (angular) range including a plurality of the monitoring areas of the antenna on the receiving side.

Further, in the configuration of the vehicle surroundings monitoring apparatus 100 shown in FIG. 1, the transmission antenna 103 and the receiving antenna 104 have been provided separately. However, an antenna may be shared for transmission and reception, while transmission and reception of signals may be switched.

Figure 7:
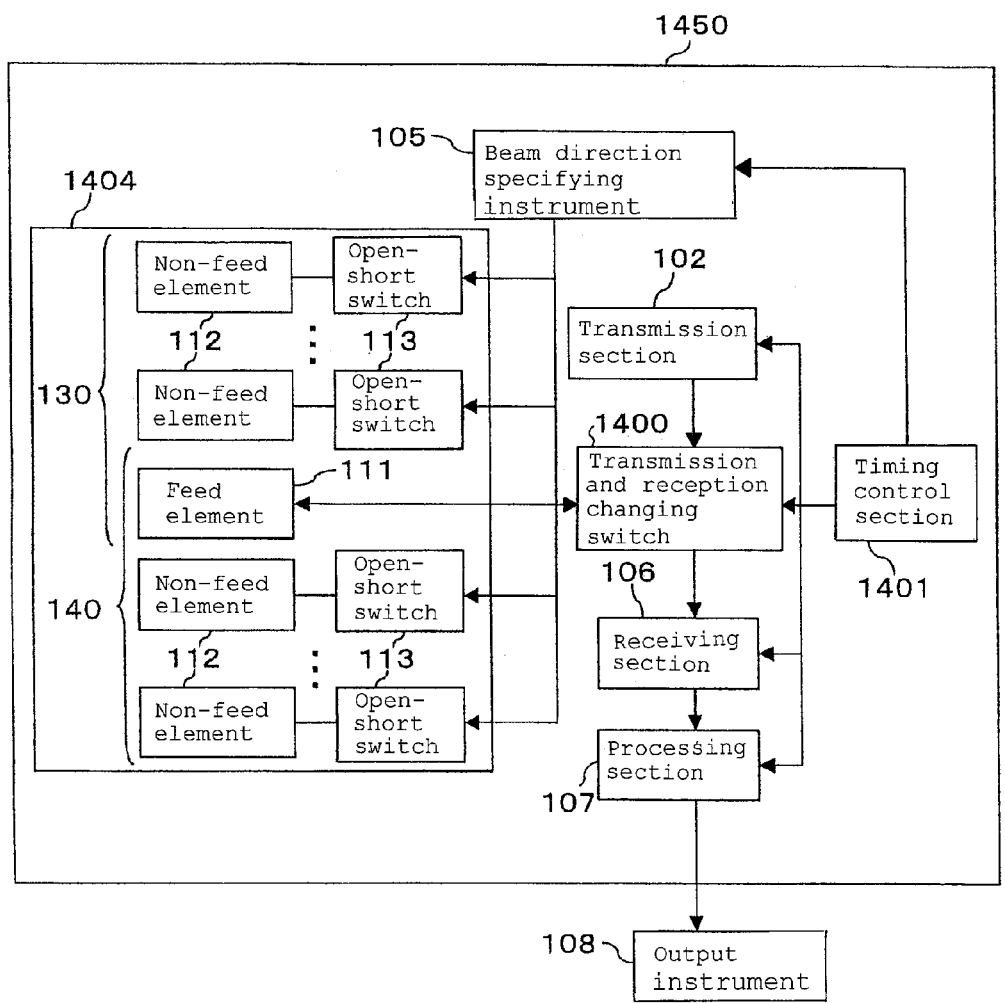
FIG. 7 is a block configuration diagram of a vehicle surroundings monitoring apparatus having yet another configuration according to Embodiment 1 of the present invention.

FIG. 7 is a configuration diagram of a vehicle surroundings monitoring apparatus 1450 in a case that the transmission antenna and the receiving antenna are constructed in the form of a shared antenna. The difference from the vehicle surroundings monitoring apparatus 100 shown in FIG. 1 is that a transmission and reception changing switch 1400 is provided so that the transmission antenna and the receiving antenna are constructed in the form of a shared antenna. Here, like components to FIG. 1 are designated by like numerals.

The transmission and receiving antenna 1404 shown in FIG. 7 has the same configuration as the receiving antenna 104 shown in FIG. 1. The transmission and reception changing switch 1400 performs control such as to switch the connection of the feed element ill in correspondence to the timing of transmission and reception of the radio wave through the transmission and receiving antenna 1404.

The transmission and reception changing switch 1400 performs control such that when a radio wave is to be sent out from the transmission and receiving antenna 1404, the transmission section 102 should be connected to the feed element 111, and that when a radio wave is to be received by the transmission and receiving antenna 1404, the receiving section 106 should be connected to the feed element 111. As such, the transmission and receiving antenna 1404 is shared in transmission and reception. Here, the transmission and reception changing switch 1400 is an example of the transmission and reception switching instrument of the present invention.

Further, in the present Embodiment 1, a dipole antenna has been employed for each of the elements constituting the transmission antenna and the receiving antenna. However, the invention is not limited to this.

Further, in the present Embodiment 1, description has been given for the case of a front monitoring apparatus in which a vehicle surroundings monitoring apparatus is arranged in the front part of a vehicle. However, a rear monitoring apparatus may be implemented in which a vehicle surroundings monitoring apparatus is arranged in the rear part of a vehicle.

In addition, an array configuration may be employed in which a plurality of antennas (of the vehicle surroundings monitoring apparatus) of the present Embodiment 1 are arranged in the Z-direction of the antenna shown in FIG. 2 while power is fed respectively to a plurality of the antennas, so that a narrow beam configuration may be realized in the Z-axis direction. By virtue of this, the monitoring area may be of long distance. In this case, when the apparatus is installed in a car, the influence of reflection from the ground surface can also be reduced.

Embodiment 2

Figure 8:
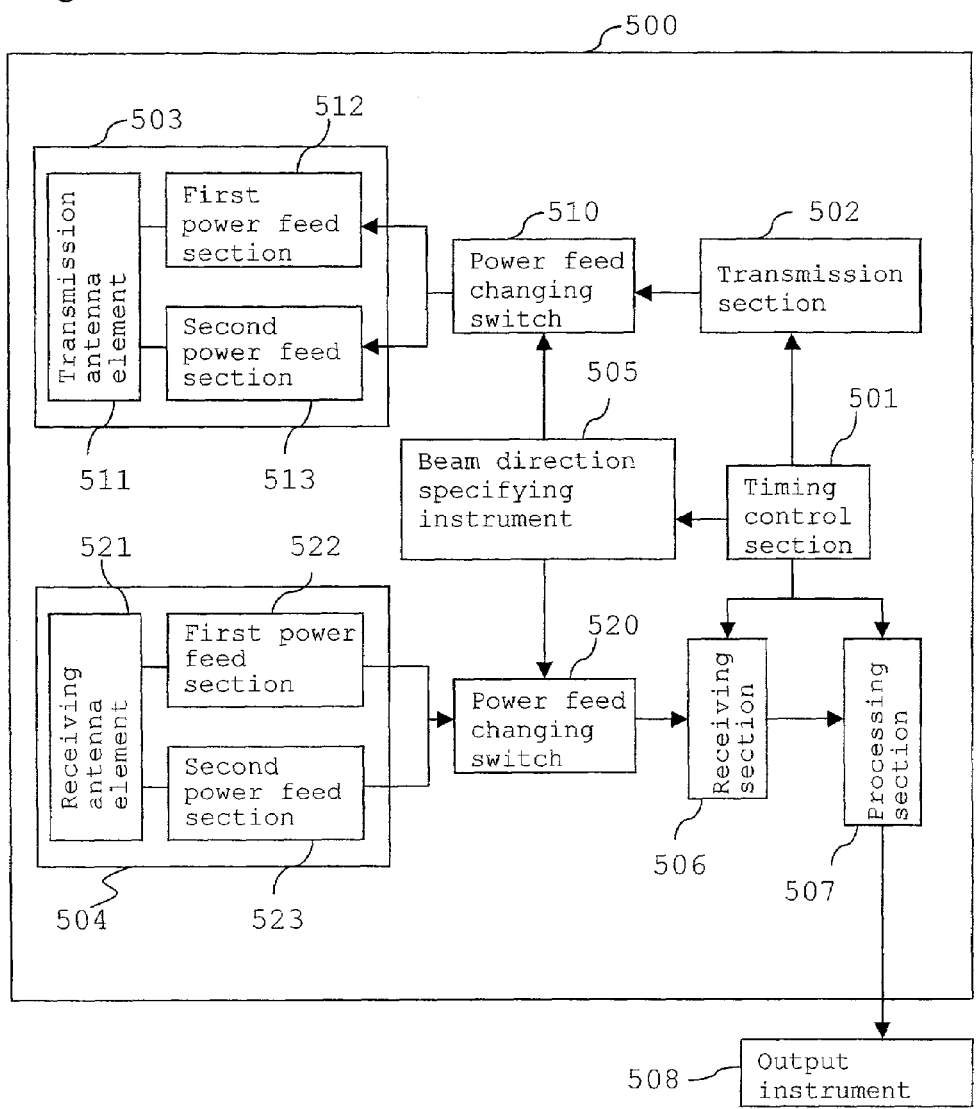
FIG. 8 is a block configuration diagram of a vehicle surroundings monitoring apparatus according to Embodiment 2 of the present invention.

FIG. 8 is a block configuration diagram of a vehicle surroundings monitoring apparatus according to Embodiment 2 of the present invention.

The vehicle surroundings monitoring apparatus 500 of the present Embodiment 2 has a configuration different from that of the vehicle surroundings monitoring apparatus 100 of Embodiment 1 shown in FIG. 1 in the point that each of the transmission antenna and the receiving antenna has a plurality of power feed ports while power feed to the power feed ports is switched so that a plurality of beam directions are realized. Here, the vehicle surroundings monitoring apparatus 500 is an example of the monitoring apparatus of the present invention.

A timing control section 501, a transmission section 502, a receiving section 506, a processing section 507, and an output instrument 508 shown in FIG. 8 have respectively the same function as the timing control section 101, the transmission section 102, the receiving section 106, the processing section 107, and the output instrument 108 shown in FIG. 1.

The transmission antenna section 503 includes: a transmission antenna element 511; and two power feed sections consisting of a first power feed section 512 and a second power feed section 513 of feeding power to the transmission antenna element 511. Similarly, the transmission antenna section 504 includes: a transmission antenna element 521; and two power feed sections consisting of a first power feed section 522 and a second power feed section 523 of feeding power to the transmission antenna element 521.

On the basis of timing signals from the timing control section 501, the beam direction specifying instrument 505 controls the power feed changing switches 510 and 520, so that the case that power is fed to the first power feed sections 512 and 522 and the case that power is fed to the second power feed sections 513 and 523 are switched with each other such that a beam should be formed in a predetermined direction.

Here, the beam direction specifying instrument 505 is an example of the beam switching instrument of the present invention.

Next, the configuration of the transmission antenna 503 and the receiving antenna 504 of the vehicle surroundings monitoring apparatus 500 of the present Embodiment 2 is described below for the case of a configuration based on a Yagi-Uda array antenna.

FIG. 9 is a configuration diagram of an antenna employing a configuration based on a Yagi-Uda array antenna. FIG. 9(a) is a perspective view, while FIG. 9(b) is a top plan view. The following description is given for the case that the operating frequency of the antenna is 24 GHz. Further, coordinate axes are defined as shown in FIG. 9, for convenience of description.

The antenna shown in FIG. 9 includes: a first Yagi-Uda array antenna composed of a radiating element 601, a reflecting element 602, and a plurality of waveguide elements 603 and 604; and a second Yagi-Uda array antenna composed of a radiating element 611, a reflecting element 612, and a plurality of waveguide elements 613 and 604. These two Yagi-Uda array antennas share the radiating element 604 at the extreme end, and are arranged around the radiating element 604 on the Y-axis, in opposite and tilted directions with respect to the Y-axis. As for the tilt relative to the Y-axis, when the X-axis is adopted as the reference, the first Yagi-Uda array antenna is arranged along a direction tilted from the X-axis direction by an angle $\phi=\alpha'$. Further, the second Yagi-Uda array antenna is arranged along a direction tilted from the X-axis direction by an angle $\phi=180-\alpha'$.

The radiating elements 601 and 611 are half wavelength dipole antennas having a length of 6 mm. The reflecting elements 602 and 612 are line-shaped elements having a length of 6 mm arranged at a position of distance d1 from the radiating elements 601 and 611, respectively. A plurality of the waveguide elements 603, 604, and 613 are arranged at a position of distance d2 from the radiating elements 601 and 611. These intervals are d2 each. At that time, the length of the waveguide elements 603, 604, and 613 is set to be 5 mm each.

As shown in FIG. 9(b), the reflecting element 602 and the waveguide elements 603 and 604 are arranged on a straight line in parallel to the radiating element 601, and thereby constitute the first Yagi-Uda array antenna. Similarly, the reflecting element 612 and the waveguide elements 613 and 604 are arranged on a straight line in parallel to the radiating element 611, and thereby constitute the second Yagi-Uda array antenna. Here, the direction of the first Yagi-Uda array antenna in which the reflecting element 602, the radiating element 601, and the waveguide elements 603 and 604 are arranged on a straight line is an example of the predetermined direction of the present invention. Further, the direction of the second Yagi-Uda array antenna in which the reflecting element 612, the radiating element 611, and the waveguide elements 613 and 604 are arranged on a straight line is an example of the direction different from the predetermined direction of the present invention.

A power feed section is provided in the central part of each of the radiating elements 601 and 611. The power feed section of the radiating element 601 corresponds to the first power feed section 512 or 522 shown in FIG. 8. The power feed section of the radiating element 611 corresponds to the second power feed section 513 or 523 shown in FIG. 8.

Next, the operation is described below for the antenna having the configuration shown in FIG. 9.

Switching operation is performed such that when power is fed to the radiating element 601 constituting the first Yagi-Uda array antenna, the radiating element 611 constituting the second Yagi-Uda array antenna should be open. Similarly, switching operation is performed such that when power is fed to the radiating element 611 constituting the second Yagi-Uda array antenna, the radiating element 601 constituting the first Yagi-Uda array antenna should be open.

When the radiating element to be fed is switched as described here, the first Yagi-Uda array antenna and the second Yagi-Uda array antenna can be switched with each other. Thus, the direction of the main beam can be switched.

FIG. 10 is a diagram showing directivity in a case that the first Yagi-Uda array antenna is solely operated that is located at $\phi=50$ degrees which is tilted from the Y-axis direction by 40 degrees. FIG. 10(a) shows directivity in the horizontal (XY) plane. FIG. 10(b) shows directivity in the vertical plane at an azimuthal angle $\phi=50$ degrees.

In FIG. 10(a), directivity 701 indicates the directivity of the vertically polarized wave (E$\theta$) component. This shows that a main beam is obtained that is tilted in the direction of an azimuthal angle $\phi=50$ degrees.

Further, in FIG. 10(b), similarly to the directivity 701, directivity 702 indicates the directivity of the vertically polarized wave (E$\theta$) component. This shows that the main beam is directed in a horizontal direction.

FIG. 11 is a diagram showing directivity in a case that the second Yagi-Uda array antenna is solely operated that is located at $\phi=130$ degrees which is tilted from the Y-axis direction by 40 degrees toward the direction opposite to the first Yagi-Uda array antenna. FIG. 11(a) shows directivity in the horizontal (XY) plane. FIG. 11(b) shows directivity in the vertical plane at an azimuthal angle $\phi=130$ degrees.

In FIG. 11(a), directivity 801 indicates the directivity of the vertically polarized wave (E$\theta$) component. This shows that a main beam is obtained that is tilted in the direction of an azimuthal angle $\phi=130$ degrees.

Further, in FIG. 11(b), similarly to the directivity 801, directivity 802 indicates the directivity of the vertically polarized wave (E$\theta$) component. This shows that the main beam is directed in a horizontal direction.

Next, the configuration of the transmission antenna 503 and the receiving antenna 504 of the vehicle surroundings monitoring apparatus 500 of the present Embodiment 2 is described below for the case that an antenna is employed that has a configuration different from the above-mentioned Yagi-Uda array antenna.

Figure 12A:
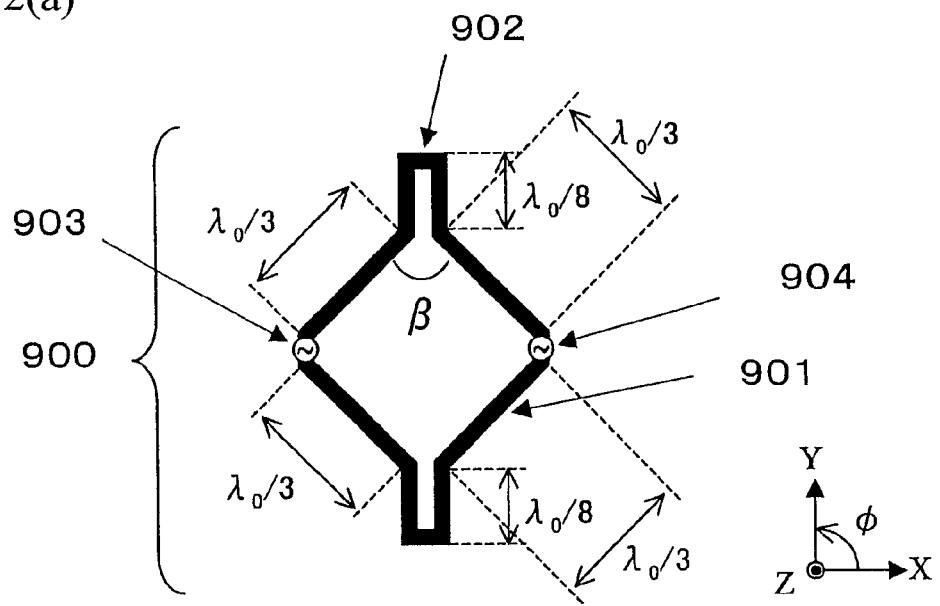
FIG. 12(a) is a top view showing the configuration of an antenna having another configuration according to Embodiment 2 of the present invention.
Figure 12B:
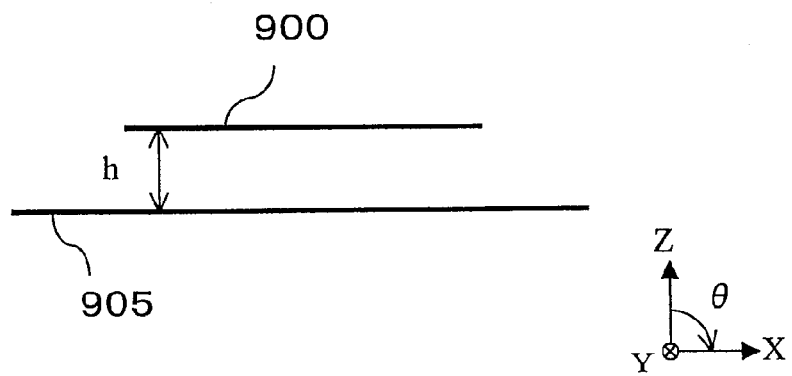
FIG. 12(b) is a side view showing the configuration of an antenna having another configuration according to Embodiment 2 of the present invention.

FIG. 12 is a detailed example of another configuration of the antenna section. FIG. 12(a) is a top view of this antenna section, while FIG. 12(b) is a side view. This antenna is described in detail in "The Institute of Electronics, Information and Communication Engineers Technical Report (Shingaku Gihou), A-P2003-157(2003-11)".

As shown in FIG. 12(a), this antenna element 900 includes: a loop element 901 of square shape having a side length of approximately ⅓ wavelength; detour elements 902 of folded shape having a length of approximately ¼ wavelength, connected to a set of opposing vertices of the loop element 901; and a first power feed port 903 and a second power feed port 904 provided at the other two vertices. Here, the antenna element 900 is an example of the rectangular antenna element of the present invention.

Further, as shown in FIG. 12(b), a reflector plate 905 (for example, having a side length of approximately 2 wavelengths) is arranged at a position of a predetermined distance h from the antenna element 900 in parallel to the antenna element 900. For example, when the operating frequency of the antenna system is set to be 24 GHz while the element is formed on a substrate having a dielectric constant of 2.26, the side length of the loop element 901 is set to be approximately 3.3 mm. Further, the detour element 902 has a folded shape generated by folding an approximately 2.5-mm length, while angle β is set to be approximately 90 degrees.

Next, the operation of the antenna section shown in FIG. 12 is described below. In FIG. 12(*a*), when one power feed port (for example, the first power feed port 903) is excited while the other power feed port (for example, the second power feed port 904) is short-circuited, the current amplitude reaches a peak at each port. At that time, a current phase difference arises between the peak points. Thus, similarly to the case of FIG. 10, the radiating pattern of this antenna becomes a main beam tilted in the −X direction by virtue of the phase difference between the peak points.

Here, in FIG. 12(*a*), the detour elements 902 have been arranged in a manner protruding to the outside of the loop in order to reduce mutual coupling with the loop element 901. However, the detour elements 902 may be arranged inward of the loop.

FIG. 13 shows a detailed example of yet another configuration of the transmission antenna section 503 and the receiving antenna section 504 of the vehicle surroundings monitoring apparatus 500 of the present Embodiment 2, and illustrates a slot configuration in a detour-element installed slot loop antenna.

FIG. 13(*a*) is a general configuration diagram of a detour-element installed slot loop antenna. FIG. 13(*b*) is a top view of a dielectric substrate viewed from the +Z axis side. FIG. 13(*c*) is a bottom view of a dielectric substrate viewed from the −Z axis side.

The slot element of this antenna is fabricated by cutting a copper foil on the +Z surface side of a dielectric substrate 1007. Then, power is fed by electromagnetic coupling with microstrip lines (MSLs) 1005 formed on the −Z surface side. Here, this slot element is an example of the slot loop antenna of the present invention.

The black slot portion shown in FIG. 13 is a hole where the copper foil is cut off. That is, the gray portions inside and outside the black slot portion on the ground surface 1006 side shown in FIG. 13(*b*) are conductor portions where the copper foil is remained. Then, the black slot part is a portion where the copper foil is cut off. On the ground surface 1006 side, the gray portion inside the slot is separated from the portion outside the slot by the slot. Thus, as shown in FIG. 13(*c*), on the bottom face side of the dielectric substrate 1007, the portion inside the slot is connected to the conductor portion outside the slot through short-circuiting lines 1009 connected to short-circuiting pins 1008 in the conductor portion.

As shown in FIG. 13(*a*), the slot part has such a shape that detour slots 1002 of folded shape connected to a set of opposing vertices of the loop slot 1001 are connected to the loop slot 1001 of square shape. Then, a first power feed port 1003 and a second power feed port 1004 are provided at the ends of the MSLs 1005 opposite to the side of power feed to the slot.

The MSLs 1005 are open at a position of length $L_1$ from the coupling part with the loop slot 1001. When the length $L_1$ is adjusted, impedance matching is achieved. Further, in order that the power feed port to be excited should be switched so that the direction of the main beam should be controlled similarly to the case of the line-shaped elements shown in FIG. 9, the coupling part between the loop slot 1001 and the MSL 1005 on the unexcited power feed port side need be open in the slot configuration shown in FIG. 13. For the purpose of this, the MSL 1005 may be power-fed at a position where the length $L_2$ from the coupling part is an integer multiple of ¼ wavelength.

Here, in FIG. 13, the detour slots 1002 have been arranged in a manner protruding to the outside of the loop in order to reduce mutual coupling with the loop slot 1001. However, the detour slots 1002 may be arranged inward of the loop.

Here, in the configuration of the vehicle surroundings monitoring apparatus 500 shown in FIG. 8 of the present Embodiment 2, the beam of the transmission antenna 503 has been switched similarly to the case of the receiving antenna 504. However, the transmitting side may be constructed from an arbitrary antenna such as a patch antenna.

Figure 14:
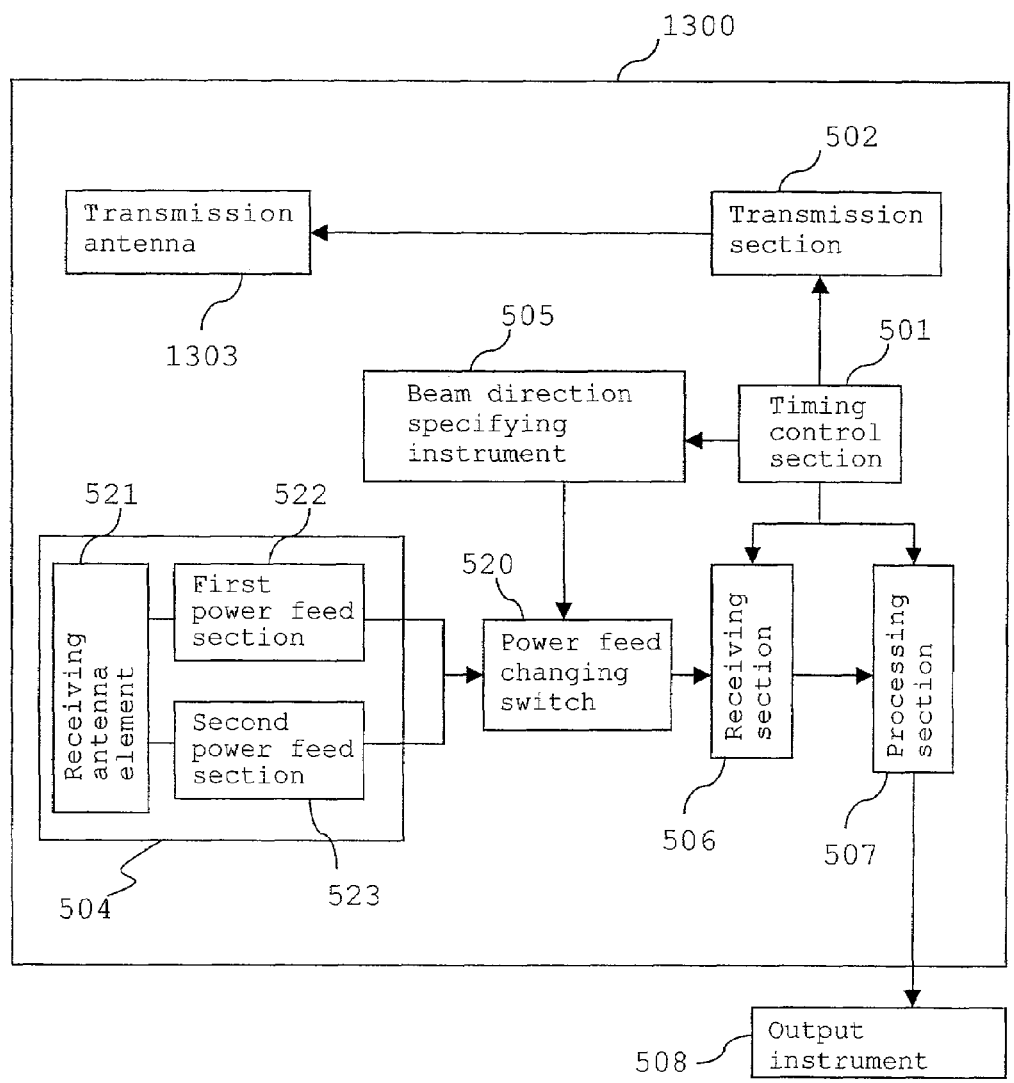
FIG. 14 is a block configuration diagram of a vehicle surroundings monitoring apparatus having another configuration according to Embodiment 2 of the present invention.

FIG. 14 is a configuration diagram of a vehicle surroundings monitoring apparatus 1300 in a case that the transmitting side is constructed from a patch antenna. The only difference is that the part of the transmission antenna 503 of the vehicle surroundings monitoring apparatus 500 shown in FIG. 8 is replaced by a transmission antenna 1303. The transmission antenna 1303 is a patch antenna having a wide directivity. Here, like components to FIG. 8 are designated by like numerals.

Further, in the configuration of the vehicle surroundings monitoring apparatus 500 shown in FIG. 8, the transmission antenna 503 and the receiving antenna 504 have been provided separately. However, an antenna may be shared for transmission and reception, while transmission and reception of signals may be switched.

Figure 15:
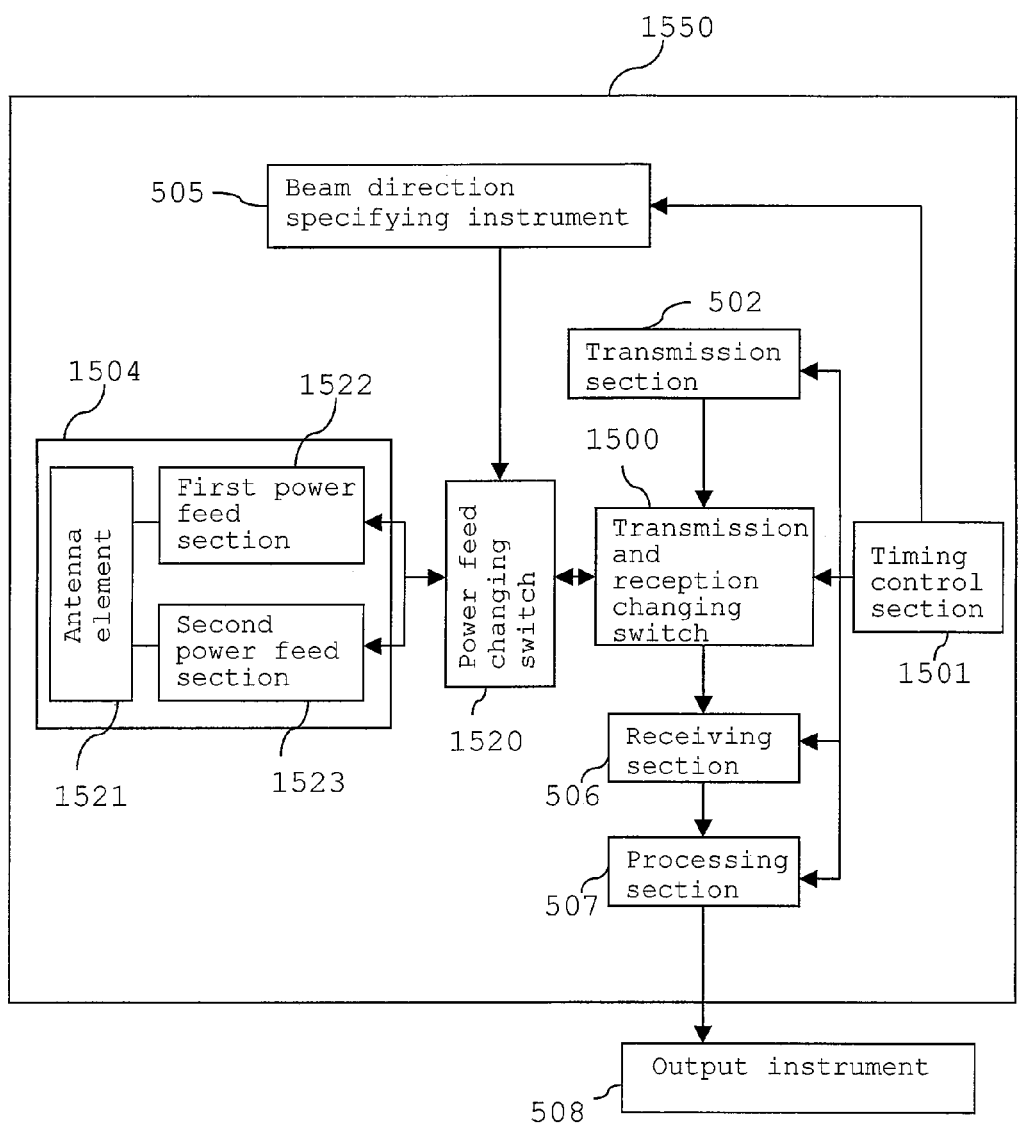
FIG. 15 is a block configuration diagram of a vehicle surroundings monitoring apparatus having yet another configuration according to Embodiment 2 of the present invention.

FIG. 15 is a configuration diagram of a vehicle surroundings monitoring apparatus 1550 in a case that the transmission antenna and the receiving antenna are constructed in the form of a shared antenna. The difference from the vehicle surroundings monitoring apparatus 500 shown in FIG. 8 is that a transmission and reception changing switch 1500 is provided so that the transmission antenna and the receiving antenna are constructed in the form of a shared antenna. Here, like components to FIG. 8 are designated by like numerals.

The transmission and receiving antenna 1504 shown in FIG. 15 has the same configuration as the receiving antenna 504 shown in FIG. 8. The transmission and reception changing switch 1500 performs control such as to switch the connection of a power feed changing switch 1520 in correspondence to the timing of transmission and reception of the radio wave through the transmission and receiving antenna 1504.

The transmission and reception changing switch 1500 performs control such that when a radio wave is to be sent out from the transmission and receiving antenna 1504, the transmission section 502 should be connected to the power feed changing switch 1520, and that when a radio wave is to be received by the transmission and receiving antenna 1504, the receiving section 506 should be connected to the power feed changing switch 1520. As such, the transmission and receiving antenna 1504 is shared in transmission and reception.

Further, in the present Embodiment 2, each antenna element constituting the transmission antenna section and the receiving antenna section has been constructed from a dipole antenna or a loop antenna provided with detour elements. However, the invention is not limited to this.

Further, similarly to Embodiment 1, the vehicle surroundings monitoring apparatus of the present Embodiment 2 may be used as a vehicle surroundings monitoring apparatus shown in FIG. 5.

Embodiment 3

Figure 16:
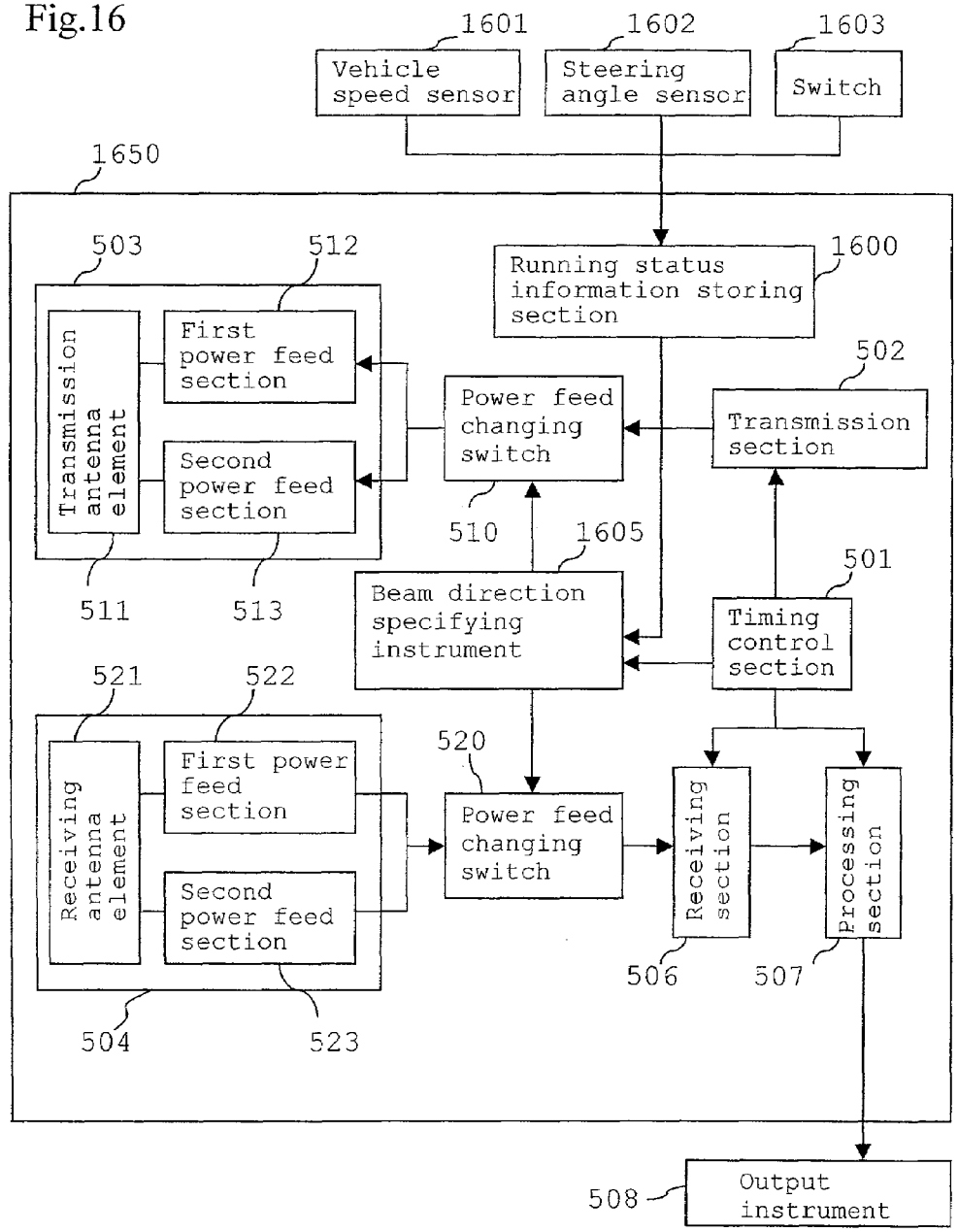
FIG. 16 is a block configuration diagram of a vehicle surroundings monitoring apparatus according to Embodiment 3 of the present invention.

FIG. 16 is a block configuration diagram of a vehicle surroundings monitoring apparatus 1650 according to Embodiment 3 of the present invention.

The vehicle surroundings monitoring apparatus 1650 of the present Embodiment 3 differs from the vehicle surroundings monitoring apparatus 500 of Embodiment 2 shown in FIG. 8 in the point that running status information storing section 1600 of storing running state information of a vehicle is provided. In FIG. 16, like components to FIG. 8 are designated by like numerals, and hence description is omitted. Here, the running status information storing section 1600 is an example of the running information storing section of the present invention.

The running status information storing section 1600 stores running state information of a vehicle obtained from a vehicle speed sensor 1601, a steering angle sensor 1602, and a switch 1603 such as a turn indicator provided in the vehicle. Then, on the basis of the running status information stored in the running status information storing section 1600, the beam direction specifying instrument 1605 determines the beam direction of the transmission antenna section 503 and the receiving antenna section 504.

Figure 17:
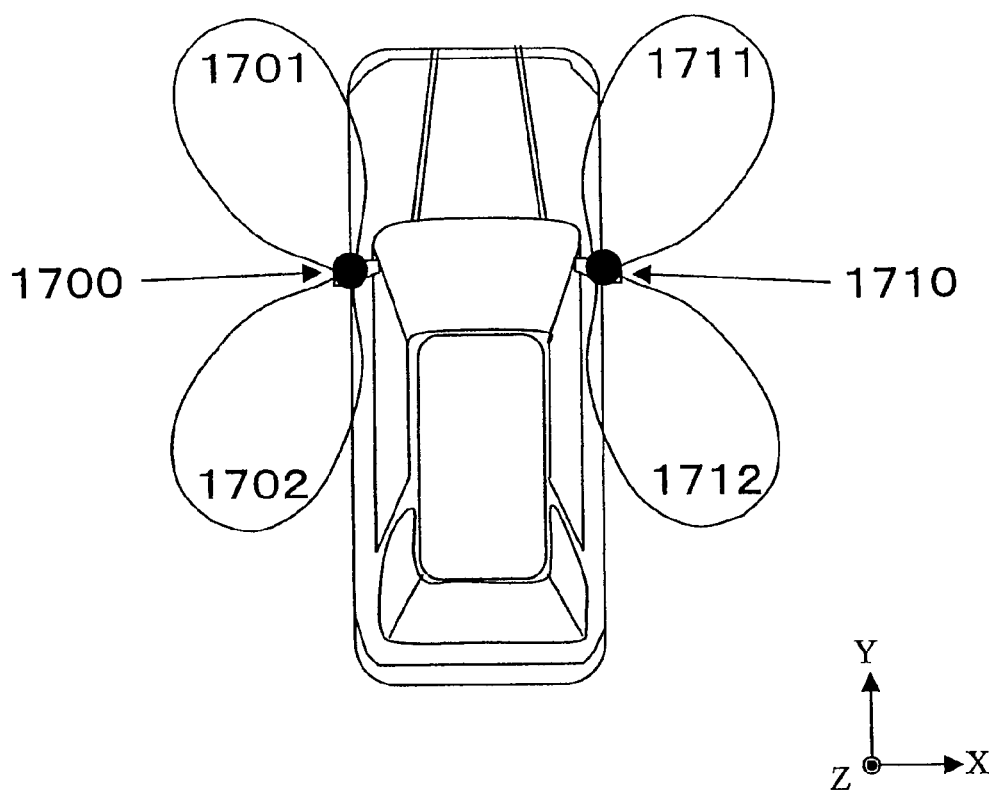
FIG. 17 is a diagram showing an example of arrangement and monitoring areas of a vehicle surroundings monitoring apparatus according to Embodiment 3 of the present invention.

FIG. 17 is a diagram showing an example of arrangement and monitoring areas of a vehicle surroundings monitoring apparatus 1650 of the present Embodiment 3.

In FIG. 17, the vehicle surroundings monitoring apparatus is installed in side faces of the vehicle, more specifically, for example, in door mirrors. The vehicle surroundings monitoring apparatuses 1700 and 1710 shown in FIG. 17 are the same as the vehicle surroundings monitoring apparatus 1650 shown in FIG. 16. The beam of the transmission antenna section 503 and the receiving antenna section 504 of each of the vehicle surroundings monitoring apparatuses 1700 and 1710 is tilted into a state close to φ=90 degrees or −90 degrees.

Specifically, in the configuration shown in FIG. 9, the first Yagi-Uda array antenna is arranged around the waveguide element 604 in a manner tilted at an angle slightly less than −90 degrees from the Y-axis direction toward the +X direction. The second Yagi-Uda array antenna is arranged in a manner tilted at an angle slightly less than +90 degrees from the Y-axis direction toward the −X direction.

Further, in the configuration shown in FIG. 12, the distance of the antenna element 900 to the reflector plate 905 is set to be 0.4-0.5 wavelength (5.00-6.25 mm for the operating frequency of 24 GHz). In this antenna, when the distance of the antenna element to the reflector plate is changed, the beam direction can be changed.

Thus, the vehicle surroundings monitoring apparatus 1700 installed on the left-hand side of the vehicle monitors the left forward region 1701 and the left rear region 1702. The vehicle surroundings monitoring apparatus 1710 installed on the right-hand side of the vehicle monitors the right front region 1711 and the right rear region 1712.

According to this configuration, in the monitoring of vehicle side areas in which vehicle surroundings monitoring apparatuses can be installed merely at limited positions, two directions (forward and rearward directions) can be covered by one vehicle surroundings monitoring apparatus.

Here, the door mirror is an example of the side mirror of the present invention. The side mirror may be a fender mirror or the like other than a side mirror.

Next, a procedure is described below in which a plurality of monitoring areas are brought into a monitored state.

In general, power feed to the vehicle surroundings monitoring apparatus 1700 and the vehicle surroundings monitoring apparatus 1710 is switched alternately for every predetermined time, so that the monitoring area 1701 and the monitoring area 1702 are monitored alternately, or the monitoring area 1711 and the monitoring area 1712 are monitored alternately. However, depending on the running scene, the region to be monitored may be controlled by an input provided from the driver through a switch or the like.

For example, when the running is in a cruise control state at a low speed, control is performed such that the forward directions consisting of the monitoring area 1701 of the vehicle surroundings monitoring apparatus 1700 and the monitoring area 1711 of the vehicle surroundings monitoring apparatus 1710 should solely be brought into a monitored state. This permits immediate detection of a cutting-ahead vehicle, and hence realizes appropriate vehicle control.

On the contrary, when the running is based on the driver's intention and at a high speed, control is performed such that the rearward directions consisting of the monitoring area 1702 of the vehicle surroundings monitoring apparatus 1700 and the monitoring area 1712 of the vehicle surroundings monitoring apparatus 1710 should solely be brought into a monitored state. This permits immediate recognition of vehicles located in the rearward direction and vehicles present within dead angles. Then, when the situation is notified to the driver, wind-up at the time of right and left turns and collision at the time of lane change can be avoided. In particular, when the driver intends lane change toward right or left and displays the direction by means of a turn indicator, the rearward direction of that direction may solely be monitored. That is, when the lane change is rightward, the monitoring area 1712 may solely be activated, while when the lane change is leftward, the monitoring area 1702 may solely be activated.

Further, when the vehicle moves forward in a state that the steering wheel is turned left, the vehicle surroundings monitoring apparatus 1700 monitors the monitoring area 1701 and the monitoring area 1702 alternately, while the vehicle surroundings monitoring apparatus 1710 brings solely the monitoring area 1711 into a monitored state. In contrast, when the vehicle moves forward in a state that the steering wheel is turned right, the vehicle surroundings monitoring apparatus 1710 monitors the monitoring area 1711 and the monitoring area 1712 alternately, while the vehicle surroundings monitoring apparatus 1700 brings solely the monitoring area 1701 into a monitored state.

By virtue of this, the rearward part of the turn direction can be monitored, so that wind-up accidents can be prevented. Further, a forward part of the direction opposite to the direction of the driver's attention is monitored by the sensor. This reduces the possibility of collision caused by careless mistakes at the time of right and left turns.

According to this configuration, power feed to the vehicle surroundings monitoring apparatuses is controlled depending on the running state of the vehicle, so that the monitoring area can be switched. That is, the monitoring area can be set up in a direction of higher possibility of collision.

Figure 18:
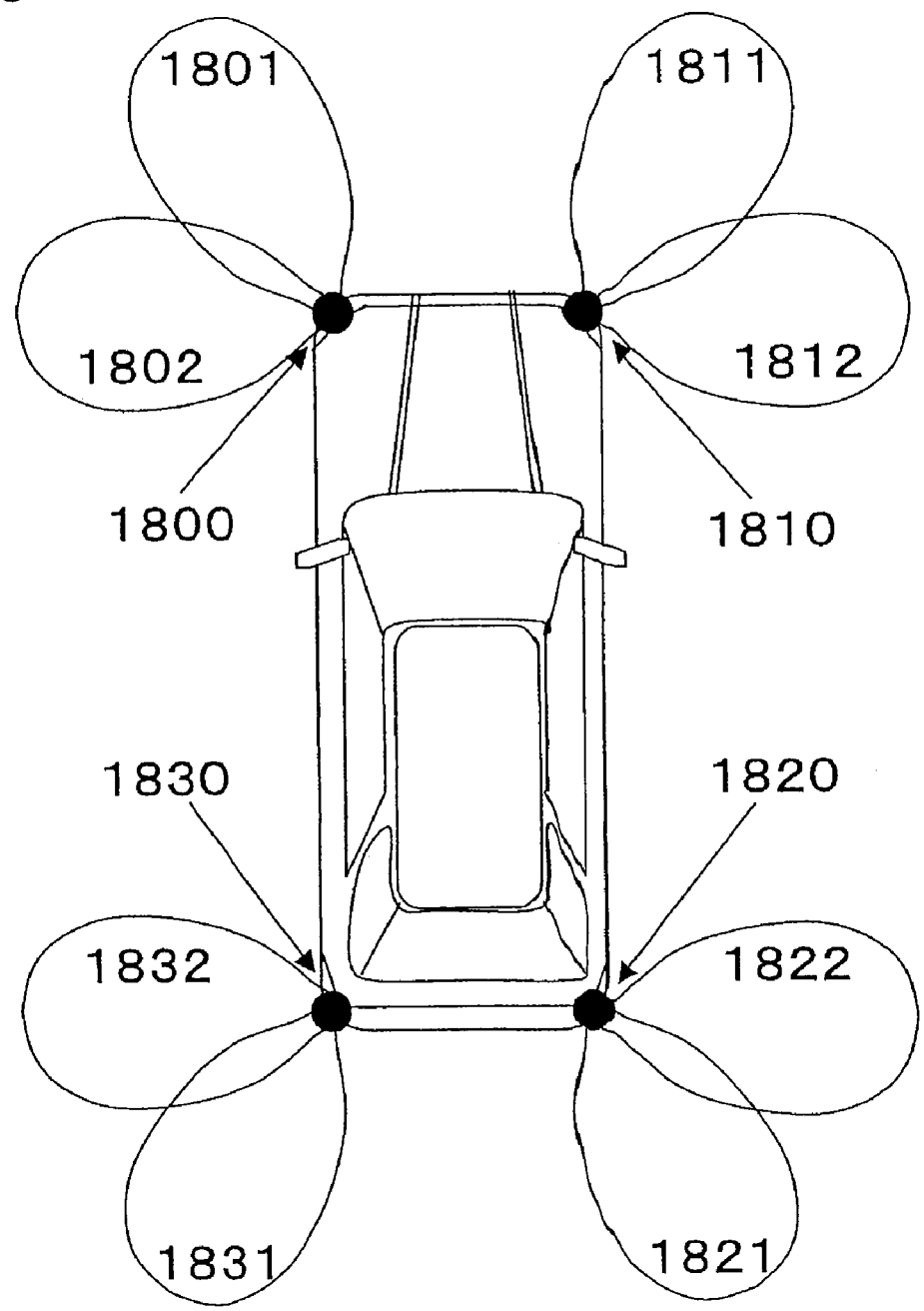
FIG. 18 is a diagram showing another example of arrangement and monitoring areas of a vehicle surroundings monitoring apparatus according to Embodiment 3 of the present invention.

FIG. 18 is a diagram showing another example of arrangement and monitoring areas of a vehicle surroundings monitoring apparatus of the present Embodiment 3.

In FIG. 18, vehicle surroundings monitoring apparatuses 1800, 1810, 1820, and 1830 are installed at the corners of the vehicle. The vehicle surroundings monitoring apparatuses 1800, 1810, 1820, and 1830 are the same as the vehicle surroundings monitoring apparatus 1650 shown in FIG. 16.

According to this arrangement, the vehicle surroundings monitoring apparatus 1800 installed on the left forward side of the vehicle monitors a monitoring area 1801 on the forward left side and a monitoring area 1802 on the left forward side. The vehicle surroundings monitoring apparatus 1810 installed on the right forward side of the vehicle monitors a monitoring area 1811 on the forward right side and a monitoring area 1812 on the right forward side. The vehicle surroundings monitoring apparatus 1820 installed on the right rearward side of the vehicle monitors a monitoring area 1821 on the rearward right side and a monitoring area 1822 on the right rearward side. The vehicle surroundings monitoring apparatus 1830 installed on the left rearward side of the vehicle monitors a monitoring area 1831 on the rearward left side and a monitoring area 1832 on the left rearward side.

When the vehicle runs at a high speed, power feed to each vehicle surroundings monitoring apparatuses is controlled such that the monitoring area 1801, the monitoring area 1811, the monitoring area 1821, and the monitoring area 1831 should be monitored.

Further, when the steering wheel is turned, the monitoring area to be activated may be changed depending on the turn direction and the turn angle. For example, when the steering wheel is turned left slightly during forward running, the monitoring area 1801 is brought into a monitored state. When turned larger, the monitoring area 1802 is brought into a monitored state. In this case, the 1822 may simultaneously be brought into a monitored area. The operation is similar to other directions of turn.

When the entire surroundings is desired to be monitored and checked once as much as possible, like at the time of departure, the 1801 and the 1812 are simultaneously activated as monitoring areas. After that, the 1802 and the 1811 are simultaneously activated as monitoring areas.

This configuration permits efficient monitoring of a wide (angular) range of vehicle surroundings without mutual interference between the vehicle surroundings monitoring apparatuses.

Here, the vehicle surroundings monitoring apparatuses have been installed in the inside of side mirrors in the case of FIG. 17 and in the corner parts of the vehicle in the case of FIG. 18. However, it is sufficient that at least the antenna parts of the vehicle surroundings monitoring apparatuses are arranged at these installation positions. That is, at least the transmission antenna section 503 and the receiving antenna section 504 shown in FIG. 16 are installed at these installation positions. The other components of the vehicle surroundings monitoring apparatuses may be installed at other positions of the vehicle.

Embodiment 4

Figure 19:
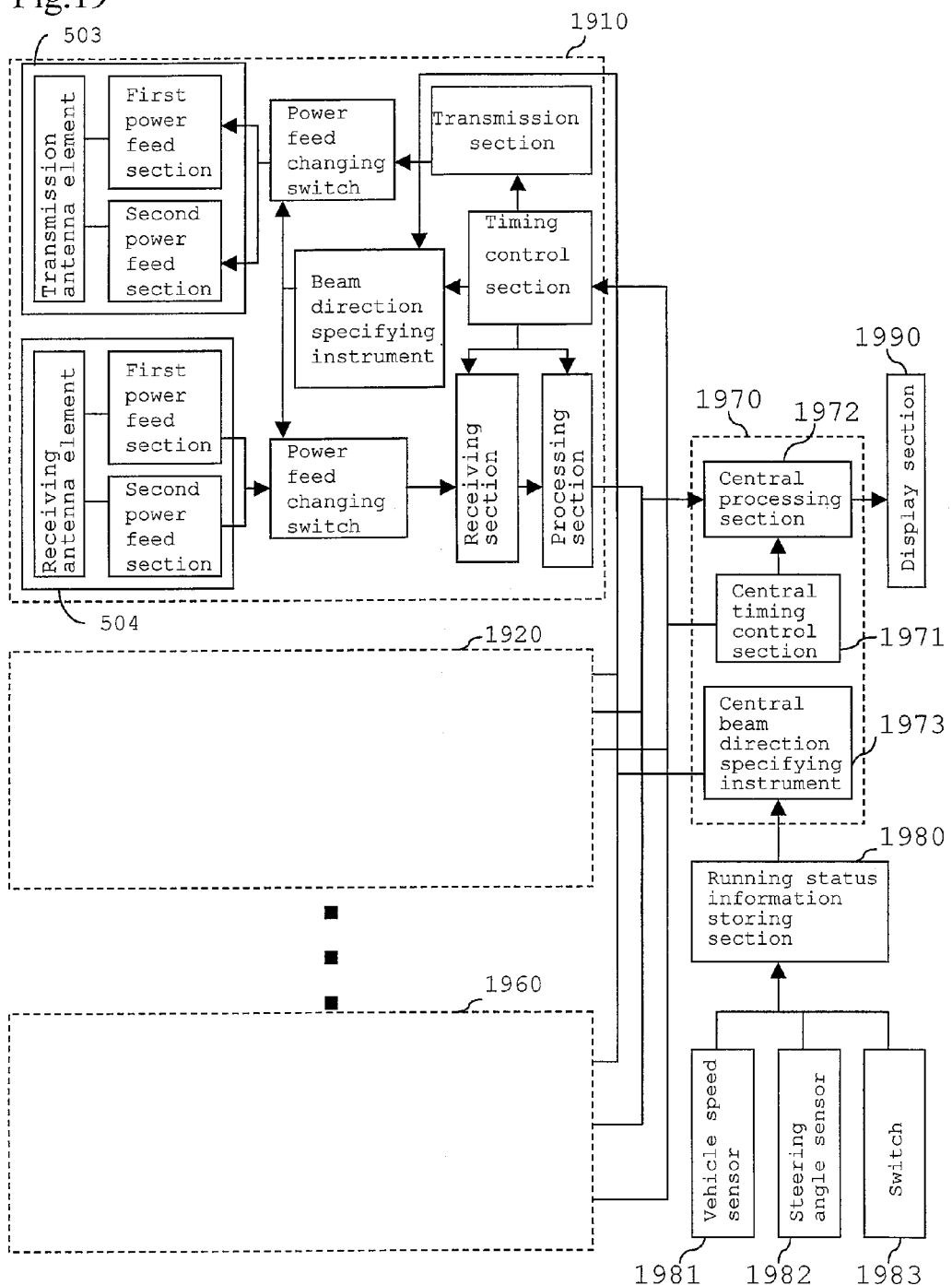
FIG. 19 is a block configuration diagram of a vehicle surroundings monitoring system according to Embodiment 4 of the present invention.

FIG. 19 is a block configuration diagram of a vehicle surroundings monitoring system according to Embodiment 4 of the present invention. The configuration and the operation of a vehicle surroundings monitoring system of the present Embodiment 4 is described below with reference to FIG. 19. Here, the vehicle surroundings monitoring system shown in FIG. 19 is an example of the surroundings monitoring system of the present invention.

In FIG. 19, the vehicle surroundings monitoring system of the present Embodiment 4 comprises: a plurality of vehicle surroundings monitoring apparatuses, for example, six vehicle surroundings monitoring apparatuses 1910, 1920, ..., 1960; a central control arithmetic operation section 1970; a running status information storing section 1980 of storing running state information of the vehicle obtained from a vehicle speed sensor 1981, a steering angle sensor 1982, and a switch 1983 such as a turn indicator; and a display section 1990.

The vehicle surroundings monitoring apparatuses 1910 and 1920, ..., 1960 are the same as the vehicle surroundings monitoring apparatus 100 of FIG. 1, the vehicle surroundings monitoring apparatus 1200 of FIG. 6, or the vehicle surroundings monitoring apparatus 1450 of FIG. 7 of Embodiment 1, or alternatively the vehicle surroundings monitoring apparatus 500 of FIG. 8, the vehicle surroundings monitoring apparatus 1300 of FIG. 14, or the vehicle surroundings monitoring apparatus 1550 of FIG. 15 of Embodiment 2. In FIG. 19, the same configuration as the vehicle surroundings monitoring apparatus 500 of FIG. 8 is adopted as an example.

The central control arithmetic operation section 1970 includes a central timing control section 1971, a central processing section 1972, and central beam direction specifying instrument 1973.

The central timing control section 1971 is connected to the timing control sections (101, 1401, 501, or 1501) of the vehicle surroundings monitoring apparatuses 1910-1960. The central beam direction specifying instrument 1973 is connected to the beam direction specifying instrument (105 or 505). Further, in the configuration of FIG. 7 or 15, the central beam direction specifying instrument 1973 is connected also to the transmission and reception changing switches (1400 or 1500). These sections and instruments operate on the basis of control signals from the central timing control section 1971.

Further, the central processing section 1972 is connected to the receiving sections (106 or 506) or the processing sections (107 or 507) of the vehicle surroundings monitoring apparatuses 1910-1960. Then, the receiving sections (106 or 506) or the processing sections (107 or 507) send received signals or results of processing of the received signals to the central processing section 1972.

On the basis of information of detection of a target obtained from the receiving sections (106 or 506) or the processing sections (107 or 507) of the vehicle surroundings monitoring apparatuses 1910-1960, the central processing section 1972 determines the degree of danger of collision with an obstacle, a person, or another vehicle in the surroundings. Then, the central processing section 1972 processes the data into a form easily recognizable to the driver, and then reports the result to the driver through the display section 1990.

The central beam direction specifying instrument 1973 sends signals to the beam direction specifying instrument (105 or 505) of the vehicle surroundings monitoring apparatuses 1910-1960, and thereby determines the beam direction.

Figure 20:
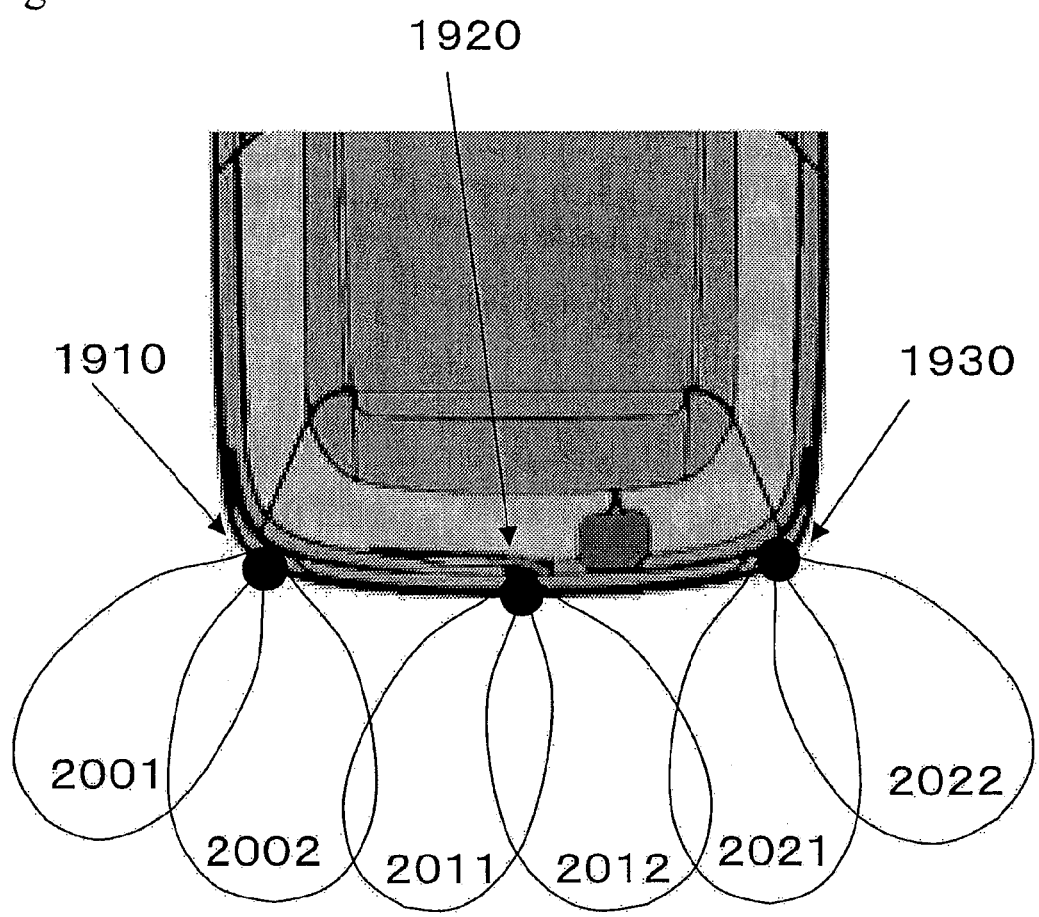
FIG. 20 is a diagram showing an example of arrangement and monitoring areas of a vehicle surroundings monitoring apparatus according to Embodiment 4 of the present invention.

FIG. 20 is an example of arrangement and monitoring areas of the vehicle surroundings monitoring apparatuses 1910-1960 in the vehicle surroundings monitoring system of the present Embodiment 4.

In FIG. 20, the vehicle surroundings monitoring apparatuses 1910, 1920, and 1930 are installed, for example, in the inside of a bumper in the rear part of the vehicle. Further, although not shown in FIG. 20, the vehicle surroundings monitoring apparatuses 1940, 1950, and 1960 are similarly installed in a bumper in the front part of the vehicle. The following description is given for the vehicle surroundings monitoring apparatuses 1910, 1920, and 1930 installed in the rear part of the vehicle.

In FIG. 20, the vehicle surroundings monitoring apparatuses 1910, 1920, and 1930 are respectively installed at three places consisting of the left end, the center, and the right end of the rear part of the vehicle. Each of the vehicle surroundings monitoring apparatuses 1910, 1920, and 1930 covers two directions (for example, the vehicle surroundings monitoring apparatus 1910 covers monitoring areas 2001 and 2002). Thus, six directions, that is, monitoring areas 2001, 2002, 2011, 2012, 2021, and 2022, are covered in total.

Figure 28:
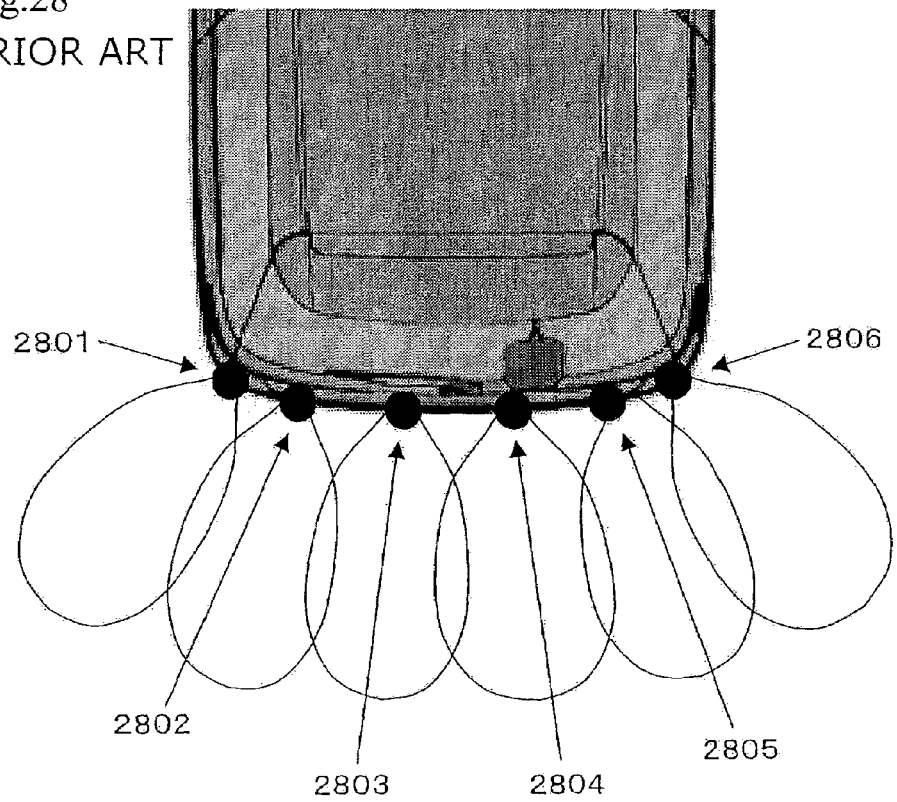
FIG. 28 is a diagram showing an example of arrangement and monitoring areas of sensors in a case that a rearward direction of a vehicle is covered by prior art sensors.

In this case, in order that the beam of the receiving antenna section should have a detecting region in the center of the vehicle surroundings monitoring apparatus, a null point should not arise here. Thus, large tilt is avoided relative to one beam. Specifically, the tilt angle of the main beam is set to be in the order of the half angle of the beam. By virtue of this, in contrast to the prior art in which vehicle surroundings monitoring apparatuses having the same beam width are employed so that six vehicle surroundings monitoring apparatuses are necessary as shown in FIG. 28, the same area can be covered using the three vehicle surroundings monitoring apparatuses 1910, 1920, and 1930 in the present Embodiment 4.

According to this configuration, a wide (angular) range of vehicle rearward direction can be monitored using a small number of vehicle surroundings monitoring apparatuses.

Next, a procedure is described below in which a plurality of monitoring areas are brought into a monitored state.

In general, when the monitoring areas are activated in time sharing, mutual interference is avoided. However, in case that interference has no influence or the influence is within an allowable (angular) range, when the number of regions simultaneously activated as monitoring areas is increased, the surroundings of the vehicle can be monitored more efficiently so that the system response speed is improved.

Figure 21:
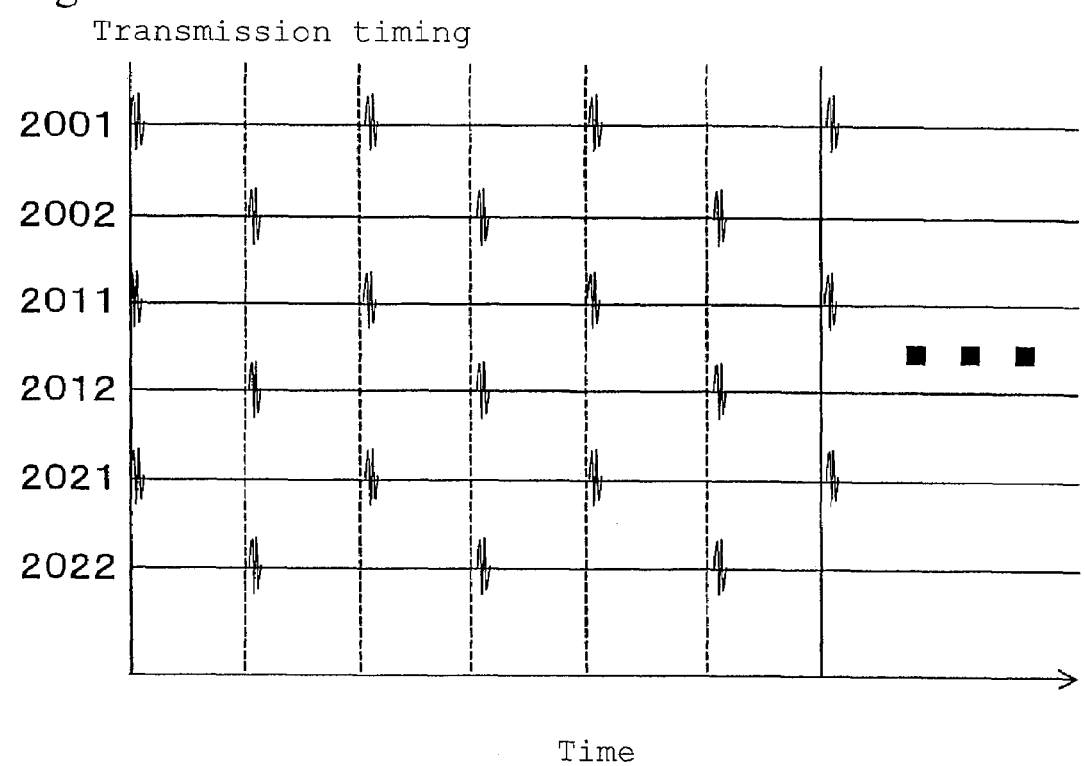
FIG. 21 is a diagram showing an example of timing of transmitting signals of a vehicle surroundings monitoring apparatus according to Embodiment 4 of the present invention.

Specifically, the central beam direction specifying instrument 1973 controls the beam direction specifying instrument (105 or 505) of the vehicle surroundings monitoring apparatuses 1910-1960 at timings shown in FIG. 21, and thereby performs detection in the monitoring areas. FIG. 21 is a diagram showing an example of time-dependent change of activation of the vehicle surroundings monitoring apparatuses 1910-1930 shown in FIG. 20, that is, an example of timing of transmitting pulses in the vehicle surroundings monitoring apparatuses 1910-1930 in an exemplary case that the vehicle surroundings monitoring apparatuses 1910-1930 are constructed from pulse radars of transmitting and receiving pulses.

As shown in FIG. 21, when the monitoring area 2001 is activated, the monitoring areas 2011 and 2021 are simultaneously activated. When the monitoring area 2002 is activated, the monitoring areas 2012 and 2022 are simultaneously activated. According to this operation, detection of an obstacle can be performed efficiently without mutual interfere.

According to this configuration, when power feed to the vehicle surroundings monitoring apparatuses is controlled so that the monitoring areas are switched, efficient monitoring of a wide (angular) range of vehicle surroundings is achieved without mutual interference between the vehicle surroundings monitoring apparatuses.

Here, the present Embodiment 4 has been described solely for the case that the vehicle surroundings monitoring apparatuses are installed in the rear part of the vehicle. However, similar control is performed also for the vehicle surroundings monitoring apparatuses installed in the front part of the vehicle. Further, the vehicle surroundings monitoring apparatuses may be installed only in the rear part or only in the front part of the vehicle.

Here, in the present Embodiment 4 shown in FIG. 19, each of the vehicle surroundings monitoring apparatuses 1910-1960 has been provided with the timing control section (101, 1401, 501, or 1501). However, the central timing control section 1971 of the central control arithmetic operation section 1970 may serve also as these timing control sections.

Further, each of the vehicle surroundings monitoring apparatuses 1910-1960 has been provided with the processing section (107 or 507). However, the central processing section 1972 of the central control arithmetic operation section 1970 may serve also as these processing sections.

Figure 22:
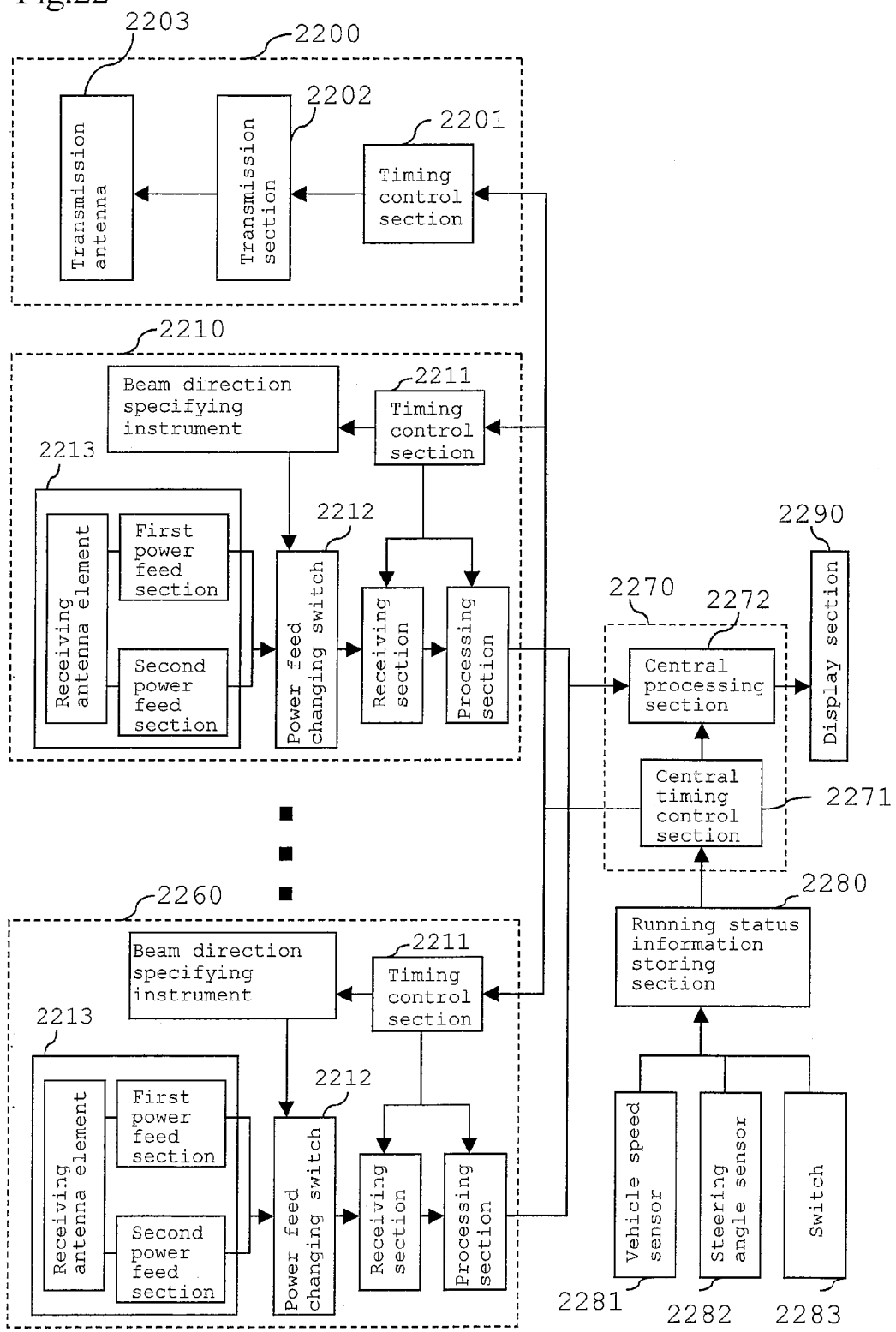
FIG. 22 is a block configuration diagram of a vehicle surroundings monitoring system having another configuration according to Embodiment 4 of the present invention.

Further, the configuration of each of the vehicle surroundings monitoring apparatuses 1910-1960 shown in FIG. 19 may be divided into a transmitting module and a receiving module. FIG. 22 is a configuration diagram of a vehicle monitoring system of the present Embodiment 4 in which a transmitting module and a receiving module are provided in a separated manner.

The vehicle monitoring system of FIG. 22 comprises one transmitting module 2200 and a plurality of receiving modules 2210-2260.

The transmitting module 2200 may have the configuration of the transmission section of the vehicle surroundings monitoring apparatus, for example, shown in FIGS. 1, 6, 7, 8, 14, and 15. The receiving modules 2210-2260 may have the configuration of the receiving section of the vehicle surroundings monitoring apparatus, for example, shown in FIGS. 1, 6, 7, 8, 14, and 15.

In FIG. 22, as an example, the configuration of the transmitting section of the vehicle surroundings monitoring apparatuses 1300 shown in FIG. 14 is adopted in the transmitting module 2200. Further, the configuration of the receiving section is adopted in the receiving modules 2210-2260.

The transmission section 2202, the transmission antenna 2203, the power feed changing switch 2212, and the receiving antenna section 2213 shown in FIG. 22 have respectively the same configuration as the transmission section 502, the transmission antenna 1303, the power feed changing switch 520, and the receiving antenna section 504 shown in FIG. 14. Further, the timing control section 2201 has the function of performing timing control on the transmitting side of the timing control section 501 of FIG. 14. The timing control section 2211 has the function of performing timing control on the receiving side of the timing control section 501 of FIG. 14.

Further, the display section 2290, the running status information storing section 2280, the vehicle speed sensor 2281, the steering angle sensor 2282, and the switch 2283 have respectively the same configuration as the display section 1990, the running status information storing section 1980, the vehicle speed sensor 1981, the steering angle sensor 1982, and the switch 1983 shown in FIG. 19. Furthermore, the central timing control section 2271 and the central processing section 2272 provided in the central control arithmetic operation section 2270 have respectively the same function as the central timing control section 1971 and the central processing section 1972 of FIG. 19.

In this case, the receiving module 2210-2260 employs an antenna of switching the beam direction, and hence includes the power feed changing switch 2212. In contrast, the transmitting module 2200 may employ an arbitrary antenna, for example, a patch antenna or the like.

Embodiment 5

Next, described below are a vehicle surroundings monitoring apparatus and a vehicle surroundings monitoring system of Embodiment 5 of the present invention.

The vehicle surroundings monitoring apparatus and the vehicle surroundings monitoring system of the present Embodiment 5 have the same configuration as the vehicle surroundings monitoring apparatus and the vehicle surroundings monitoring system described in Embodiments 1-4, but can more accurately detect the position of a detection target.

As described in Embodiments 1-4, since the beam direction of the receiving antenna is switched in the vehicle surroundings monitoring apparatus of these embodiments, monitoring areas in two different directions can be monitored using a single vehicle surroundings monitoring apparatus. Further, as described above, the angle between these two directions can be set up arbitrarily depending on the situation of surroundings and the application. In a case that the angle between these two directions are set up such that the two monitoring areas should partly overlap with each other, when a detection target is located in the overlap region of the two monitoring areas, the detection target is detected in both monitoring areas.

For example, in a case that the two beam directions of the receiving antenna are set up such that two monitoring areas 2021 and 2022 should partly overlap with each other as in the vehicle surroundings monitoring apparatus 1930 shown in FIG. 20, when a detection target is located in the overlap region of the monitoring areas, the direction in which the detection target is present can be detected as two separate directions. Here, the direction of presence of the detection target relative to the vehicle surroundings monitoring apparatus 1930 is an example of the direction toward a target of the present invention.

The vehicle surroundings monitoring apparatus of the present Embodiment 5 treats, as a set, two monitoring areas (for example, the monitoring areas 2021 and 2022 of the vehicle surroundings monitoring apparatus 1930) that have approximately the same beam emission position and partly overlap with each other. By virtue of this, the angle of direction of presence of a detection target is calculated with finer angular resolution, so that accurate position of the detection target is recognized.

Next, a method of calculating the angle of direction of presence of a detection target in the vehicle surroundings monitoring apparatus of the present Embodiment 5 is described below with reference to FIG. 23.

In the following description, the vehicle surroundings monitoring apparatus 100 having the configuration of FIG. 1 is used as the vehicle surroundings monitoring apparatus 1930 shown in FIG. 20.

Figure 23A:
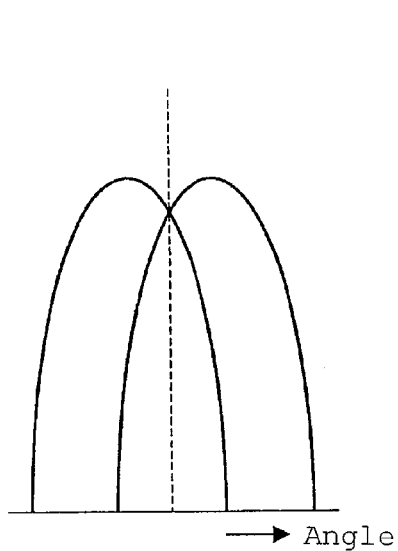
FIG. 23(a) is a diagram showing two beam patterns, which describes a method of calculating the angle of direction in which a material body is present in a vehicle surroundings monitoring apparatus according to Embodiment 5 of the present invention.
Figure 23B:
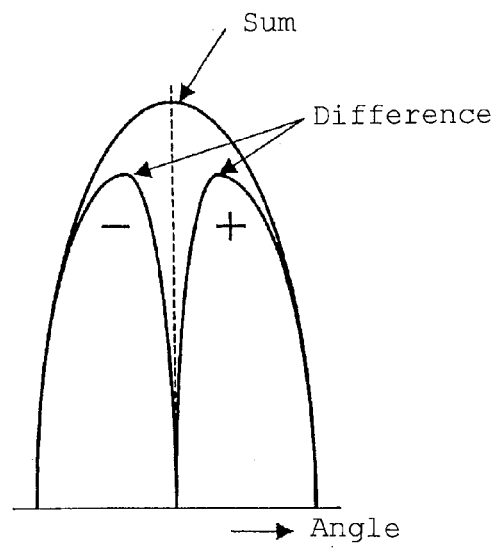
FIG. 23(b) is a diagram showing sum and difference patterns, which describes a method of calculating the angle of direction in which a material body is present in a vehicle surroundings monitoring apparatus according to Embodiment 5 of the present invention.
Figure 23C:
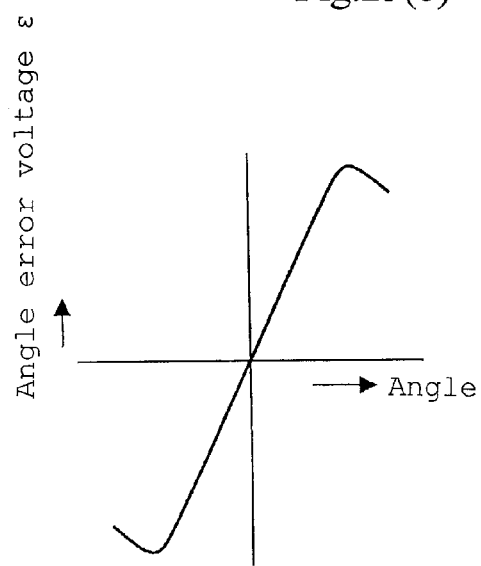
FIG. 23(c) is a diagram showing an angle error voltage, which describes a method of calculating the angle of direction in which a material body is present in a vehicle surroundings monitoring apparatus according to Embodiment 5 of the present invention.

FIG. 23(*a*) shows the patterns of two switching beams that partly overlap with each other and correspond to the two monitoring areas 2021 and 2022. The processing section 107 retains reflection signals from these two switching beams, and thereby generates a sum signal (Σ) and a difference signal (Δ) from their amplitudes. FIG. 23(*b*) shows the patterns of the sum signal (Σ) and the difference signal (Δ) generated from the two beam patterns of FIG. 23(*a*) by the processing section 107.

Then, the processing section 107 generates an angle error voltage ∈ generated by normalizing the difference signal (Δ) with the sum signal (Σ). That is, the angle error voltage ∈ is obtained by an arithmetic operation according to formula (1).

$$\in = \Delta/\Sigma \quad (1)$$

FIG. 23(*c*) show the relation between the angle error voltage ∈ generated by normalizing the difference signal (Δ) with the sum signal (Σ) and the angle. As such, the angle error voltage ∈ has an approximate S-shape, and permits the detection of deviation from the center direction between the two beams. The reason of the normalization with the sum signal (Σ) is that if the angle were measured using only the difference signal (Δ), the signal could vary notably depending on the size and the distance of a target.

When the center direction of the two beams is denoted by $\theta_0$ while the angle obtained from the angle error voltage ∈ is denoted by Δθ, the direction θ of presence of a target is expressed by formula (2).

$$\theta = \theta_0 + \Delta\theta \quad (2)$$

The processing section 107 acquires the direction θ of presence of the detection target from this formula (2).

Here, the sum signal (Σ) and the difference signal (Δ) may be generated, for example, by digital processing of digital signals obtained by AD conversion of the reflection signals, or alternatively by passing the reflection signals itself through a pre-comparator.

Figure 24:
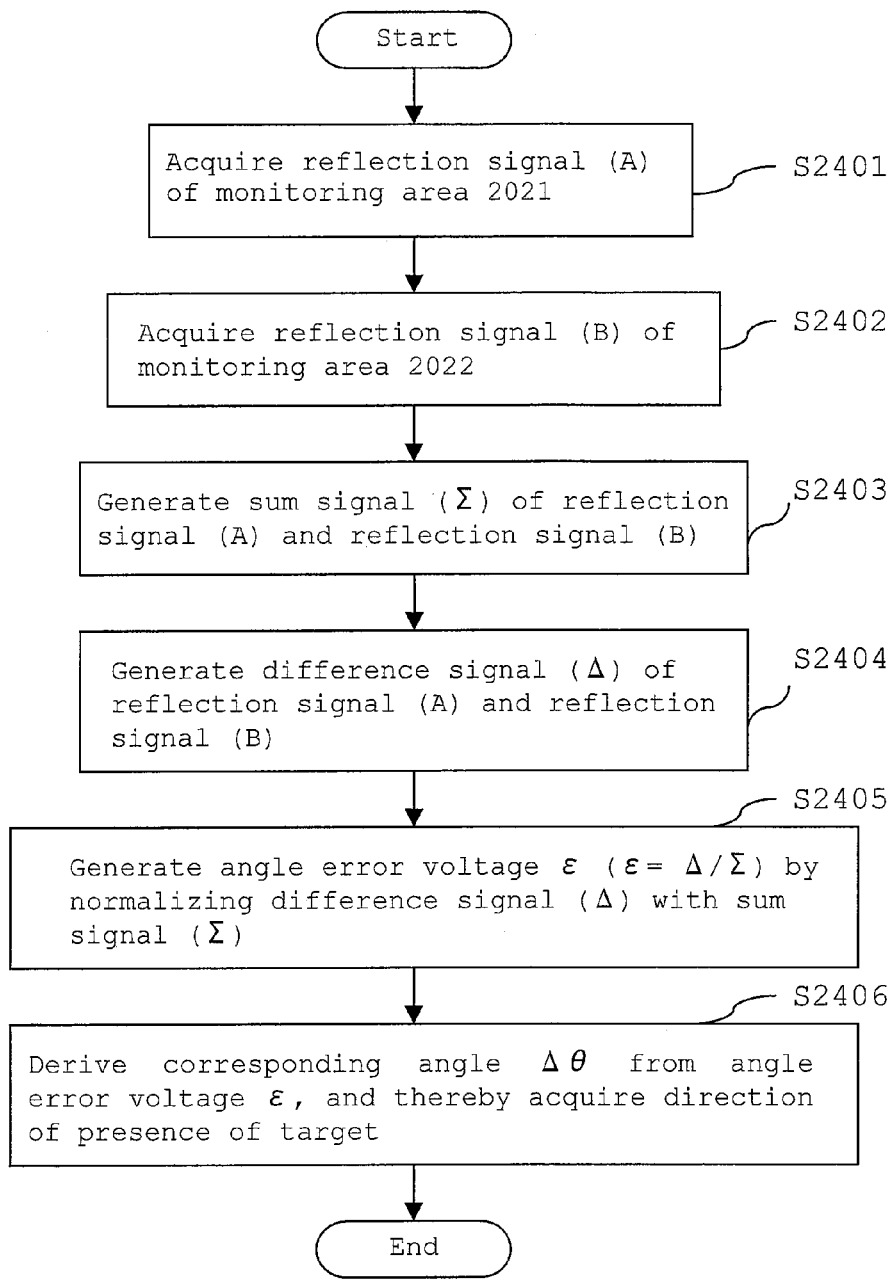
FIG. 24 is a flow chart of calculating the angle of the direction in which a material body is present in a vehicle surroundings monitoring apparatus according to Embodiment 5 of the present invention.

FIG. 24 is a flow chart of calculating the direction θ of presence of a target.

First, the beam direction specifying instrument 105 sets up the antenna beam such that the monitoring area should become 2021. When a detection target is present, the receiving section 106 acquires a reflection signal (A) reflected and returned from the detection target, and then retains the signal in a storage area in the receiving section 106 (S2401).

Next, the beam direction specifying instrument 105 sets up the antenna beam such that the monitoring area should become 2022. When a detection target is present, the receiving section 106 acquires a reflection signal (B) reflected and returned from the detection target, and then retains the signal in a storage area in the receiving section 106 (S2402).

Then, the processing section 107 generates a sum signal (Σ) of the reflection signal (A) and the reflection signal (B) (S2403), and generates a difference signal (Δ) of the reflection signal (A) and the reflection signal (B) (S2404). Then, the processing section 107 divides and normalizes the obtained difference signal (Δ) with the sum signal (Σ), and thereby calculates an angle error voltage (∈) (S2405).

Further, with referring to the data retained already in the memory, the processing section 107 derives a corresponding angle (Δθ) from the angle error voltage (∈), and thereby acquires the direction θ of presence of the detection target (S2406). On the basis of the obtained direction θ and the distance obtained from the time of arrival (time from the send-out) of the reflection signal, the processing section 107 acquires accurate position of the detection target.

Here, the processing section 107 is an example of the first target position determination section of the present invention.

Figure 25A:
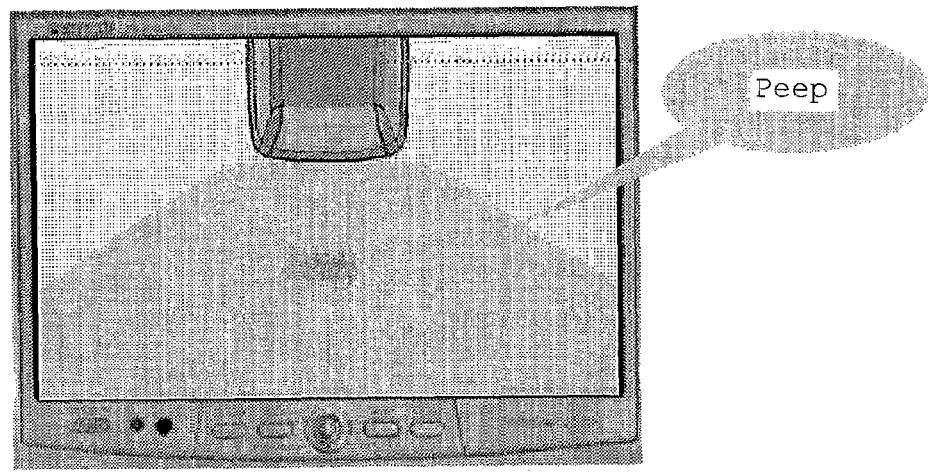
FIG. 25(a) is a diagram showing a display screen in a car cabin in a vehicle surroundings monitoring system according to Embodiment 5 of the present invention.
Figure 25B:
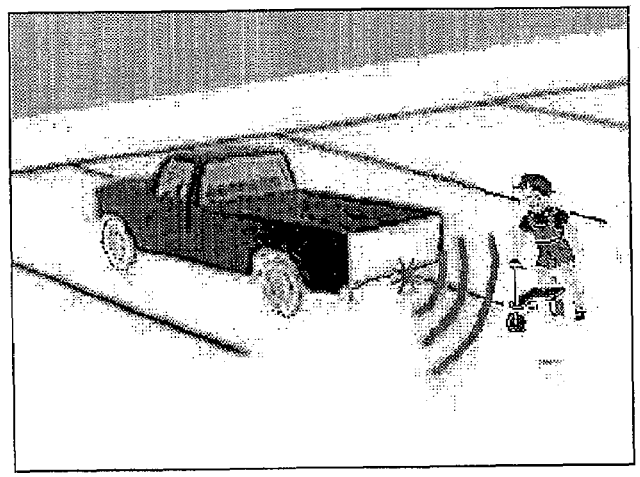
FIG. 25(b) is a diagram showing a scene of detection in the rearward direction of the vehicle in a vehicle surroundings monitoring system according to Embodiment 5 of the present invention.
Figure 27:
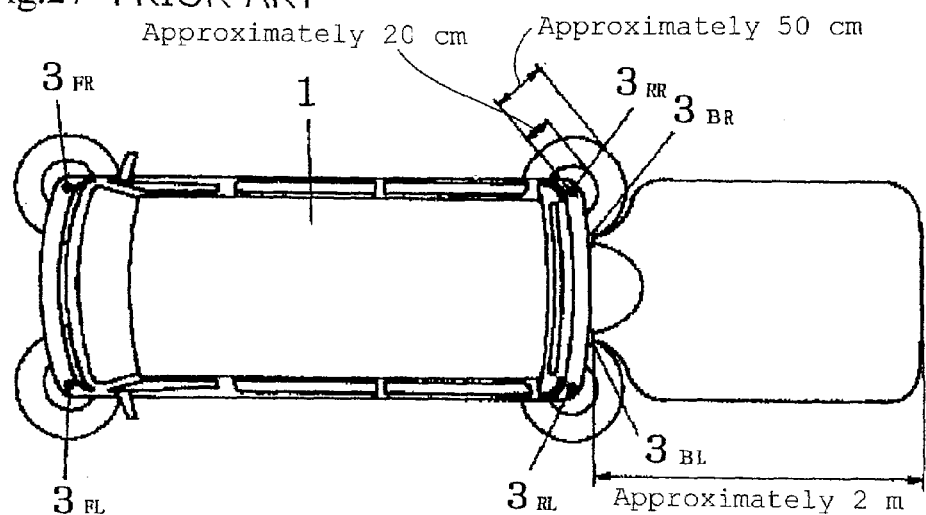
FIG. 27 is an arrangement diagram of a prior art vehicle surroundings monitoring apparatus.

FIG. 25 is a diagram showing an example of display contents concerning the situation of the surroundings of a vehicle provided to a driver, in a vehicle surroundings monitoring system employing a vehicle surroundings monitoring apparatus of the present Embodiment 5 described here.

FIG. 25(*b*) is a diagram showing an exemplary scene in which a child is present in a rearward direction of a vehicle. FIG. 25(*a*) shows the display contents displayed in the case of such a scene, on a display unit of the vehicle surroundings monitoring system of the present Embodiment 5 installed in the vehicle.

As such, the driver can recognize accurate position of the child who is present in a rearward direction of the vehicle where direct checking is difficult.

Further, since such fine angular resolution is obtained so that the position of a detection target can be detected accurately, more fine-tuned warning can be performed in which, for example, an expected running area is determined on the basis of steering angle data obtained by the steering angle sensor, so that when no collision is expected, no alarm should be generated even when a detection target is present in a rearward direction.

FIG. 26 is a diagram showing an example of performing alarm control on the basis of such steering angle data. FIG. 26(*a*) is a diagram showing a situation that an unavoidable detection target is present. FIG. 26(*b*) is a diagram showing a situation that an avoidable detection target is present.

In FIG. 26, vehicle surroundings monitoring apparatuses 1650 having the configuration of FIG. 16 incorporating the steering angle sensor 1602 are provided as the vehicle surroundings monitoring apparatuses 1910, 1920, and 1930 shown in FIG. 20. These vehicle surroundings monitoring apparatuses 1910, 1920, and 1930 have the function of the vehicle surroundings monitoring apparatus of the present Embodiment 5 capable of acquiring accurate position of a detection target on the basis of fine angular resolution.

Dotted lines shown in FIGS. 26(a) and 26(b) indicate the path of the vehicle body when the vehicle moves rearward.

In FIG. 26(a), a detection target is present at a position where the vehicle body could collide if the vehicle would straightly move rearward. In this case, the processing section 507 of the vehicle surroundings monitoring apparatus 1930 acquires accurate position of the detection target located in the overlap region of the two monitoring areas 2021 and 2022. Further, on the basis of the information obtained from the steering angle sensor 1602, the processing section 507 recognizes that the vehicle straightly moves rearward. From these pieces of information, the processing section 507 determines that if the vehicle would continue to move rearward in this state, the vehicle body could collide with the detection target. Thus, the processing section 507 generates warning.

In contrast, in a case that a detection target is located at the position shown in the upper part of FIG. 26(b), even when the vehicle straightly moves rearward, the vehicle body does not collide with the detection target. Thus, no warning is generated.

In the lower part of FIG. 26(b), a detection target is present in the same position as that of FIG. 26(a). However, in this case, the vehicle moves rearward while turning the steering wheel to the left. Thus, even when the vehicle continues to move rearward, the vehicle body does not collide with the detection target. On the basis of the information obtained from the steering angle sensor 1602, the processing section 507 recognizes that the vehicle moves rearward while turning to the left, and hence determines that the vehicle body does not collide with the detection target. Thus, no warning is generated in this case.

Here, in the description given above, the vehicle surroundings monitoring apparatus 1930 has been employed as the vehicle surroundings monitoring apparatus 1650 shown in FIG. 16, so that the processing section 507 of the vehicle surroundings monitoring apparatus 1930 has performed the determination of the position of a detection target and the determination of necessity or non-necessity of generation of warning. However, the vehicle surroundings monitoring system as shown in FIG. 19 may be employed so that the central processing section 1972 may perform these determinations. In this case, the central processing section 1972 is an example of the first target position determination section of the present invention.

When the angle between the two beam directions of the vehicle surroundings monitoring apparatus is narrowed so that the overlap of the two monitoring areas is enhanced, the (angular) range where accurate position of a detection target can be obtained can be enhanced.

Alternatively, accurate position of a detection target may be detected on the basis of plural pieces of information obtained from a plurality of surroundings monitoring apparatuses arranged at different positions. That is, as shown in FIG. 20, different vehicle surroundings monitoring apparatuses 1910, 1920, and 1930 maybe arranged at distant positions. Then, when a detection target is present at a position where monitoring areas of the different vehicle surroundings monitoring apparatuses overlap with each other, the position of the detection target may be determined on the basis of the information obtained from the two vehicle surroundings monitoring apparatuses.

A method of determining the position of a detection target of this case is described below for an example of the vehicle surroundings monitoring system of the configuration of FIG. 19 where different vehicle surroundings monitoring apparatuses 1910, 1920, and 1930 are arranged at distant positions as shown in FIG. 20.

When a detection target is present at a position where the monitoring areas of the vehicle surroundings monitoring apparatus 1920 and the vehicle surroundings monitoring apparatus 1930 overlap with each other (a region where the monitoring area 2012 and the monitoring area 2021 overlap with each other), the processing section of the vehicle surroundings monitoring apparatus 1920 acquires the distance from the vehicle surroundings monitoring apparatus 1920 to the detection target. Similarly, the processing section of the vehicle surroundings monitoring apparatus 1930 acquires the distance from the vehicle surroundings monitoring apparatus 1930 to the detection target.

The processing sections of the vehicle surroundings monitoring apparatus 1920 and the vehicle surroundings monitoring apparatus 1930 transmit each information on the distance to the detection target, to the central processing section 1972. Then, the central processing section 1972 calculates accurate position of the detection target on the basis of these two pieces of information on the distance by the triangulation method, that is, according to a formula of relation between the side lengths and the angles of a triangle.

In this case, the vehicle surroundings monitoring apparatus 1920 is an example of the one monitoring apparatus of the present invention. The vehicle surroundings monitoring apparatus 1930 is an example of the another monitoring apparatus of the present invention. Further, the central processing section 1972 is an example of the second target position determination section of the present invention.

When the above-mentioned method in which the position of a detection target is determined on the basis of two beam directions of one vehicle surroundings monitoring apparatus and the method described here in which the position of a detection target is determined in a region where monitoring areas of different vehicle surroundings monitoring apparatuses overlap with each other are employed together, accurate position of the detection target can be acquired over a wider (angular) range.

As described above, when the vehicle surroundings monitoring apparatus and the vehicle surroundings monitoring system of the present Embodiment 5 are employed, a reliable collision warning system is implemented.

The above-mentioned embodiments have been described for the case that the monitoring apparatus of the present invention is installed in a vehicle. However, the apparatus may be installed in other places. For example, when installed in the inside or outside of a building, the apparatus is applicable in security use, counting of the number of entering and exiting persons, and the like.

The program of the present invention is a program which causes a computer to perform the operation of the step of determining which monitoring area among a plurality of monitoring areas that can be monitored when a beam direction of the radio wave is switched should be activated at which timing on the basis of running state information of said vehicle, and of thereby controlling the monitoring area, in the monitoring control method of the above-mentioned invention, and which operates in cooperation with the computer.

Further, the recording medium of the present invention is a computer-readable recording medium which carries a program of causing a computer to perform the operation of the step of determining which monitoring area among a plurality of monitoring areas that can be monitored when a beam direction of the radio wave is switched should be activated at which timing on the basis of running state information of said vehicle, and of thereby controlling the monitoring area, in the monitoring control method of the above-mentioned invention, wherein said program having been read out is utilized in cooperation with said computer.

Further, a mode of use of the program according to the present invention may be that the program is recorded in a computer-readable recording medium and operates in cooperation with a computer.

Further, the scope of the recording medium includes a ROM.

Further, the above-mentioned computer according to the present invention is not restricted to genuine hardware such as a CPU, and may be firmware, an OS, and a peripheral device.

As described above, the configuration according to the present invention may be implemented by software or hardware.

As such, the present invention disclosed in this specification, the drawings, and the like relates to a surroundings monitoring system, a vehicle, and a monitoring control method for a monitoring apparatus that send out a radio wave, then receive a reflected reflection signal, and thereby detect a material body and a person present in the surroundings. These inventions are listed as follows. Here, it should be noted that these inventions provide a surroundings monitoring system, a vehicle, and a monitoring control method for a monitoring apparatus capable of monitoring a wide (angular) range of vehicle surroundings or the like using a small number of radar sensors.

A first aspect of the invention is a monitoring apparatus for sending out a radio wave, then receiving a radio wave generated by reflection of the radio wave, and thereby detecting a target including a material body and/or a human body, said apparatus comprising:

a transmission antenna section for sending out a radio wave having directivity of a predetermined (angular) range, or alternatively of sending out in different beam directions a radio wave having directivity of an (angular) range narrower than said predetermined (angular) range;

a receiving antenna section for receiving in each different beam direction the radio wave transmitted by said transmission antenna section and then reflected by said target;

a transmission section for transmitting to said transmission antenna section a signal to be sent out as said radio wave;

a receiving section to which the radio wave received by said receiving antenna section is transmitted as a signal from said receiving antenna section; and beam switching instrument which switches the beam direction sequentially when said receiving antenna section receives said radio wave in said each different beam direction, and which thereby controls a monitoring area.

A second aspect of the invention is a monitoring apparatus of the above-mentioned first aspect of the invention, wherein when said transmission antenna section sends out said radio wave in different beam directions, said beam switching instrument sequentially switches the beam direction of the transmitted radio wave and thereby controls the monitoring area.

A third aspect of the invention is a monitoring apparatus of the above-mentioned second aspect of the invention, comprising transmission and reception switching instrument which switches a signal transmitted from said transmission section and a signal transmitted to said receiving section, wherein said receiving antenna section serves also as said transmission antenna section, while transmission or reception of the radio wave is switched by said transmission and reception switching instrument.

A fourth aspect of the invention is a monitoring apparatus of the above-mentioned first aspect of the invention, wherein said receiving antenna section includes one feed element and a plurality of non-feed elements each having a switching element in a central part thereof, and wherein said beam switching instrument opens or short-circuits each of a plurality of said switching elements individually, and thereby switches the beam direction of the radio wave received by said receiving antenna section.

A fifth aspect of the invention is a monitoring apparatus of the above-mentioned fourth aspect of the invention, wherein each of said feed element and a plurality of said non-feed elements has a bar shape, and wherein a part of a plurality of said non-feed elements are aligned in line in a predetermined direction in parallel to said feed element, while the other part of a plurality of said non-feed elements are aligned in line in a direction different from said predetermined direction, in parallel to said feed element.

A sixth aspect of the invention is a monitoring apparatus of the above-mentioned second aspect of the invention, wherein said transmission antenna section includes one feed element and a plurality of non-feed elements each having a switching element in a central part thereof, and wherein said beam switching instrument opens or short-circuits each of a plurality of said switching elements individually, thereby switches the beam direction of the radio wave, and thereby sends out the radio wave from said transmission antenna section in different beam directions.

A seventh aspect of the invention is a monitoring apparatus of the above-mentioned first aspect of the invention, wherein said receiving antenna section includes a first power feed section and a second power feed section, and wherein said beam switching instrument performs switching such that power should be fed to either said first power feed section or said second power feed section, and thereby forms beam directions of two radio waves.

An eighth aspect of the invention is a monitoring apparatus of the above-mentioned seventh aspect of the invention, wherein said receiving antenna section includes: a first feed element having said first power feed section; a second feed element having said second power feed section; and a plurality of non-feed elements, wherein each of said first feed element, said second feed element, and a plurality of said non-feed elements has a bar shape, wherein a part of a plurality of said non-feed elements are aligned in line in a predetermined direction in parallel to said first feed element, while the other part of a plurality of said non-feed elements are aligned in line in a direction different from said predetermined direction, in parallel to said second feed element, and wherein one non-feed element among said part of a plurality of said non-feed elements serves also as one non-feed element among said other part of a plurality of said non-feed elements.

A ninth aspect of the invention is a monitoring apparatus of the above-mentioned seventh aspect of the invention, wherein said receiving antenna section includes a reflector plate and a rectangular antenna element parallel to said reflector plate, and wherein said rectangular antenna element retains said first power feed section and said second power feed section at a pair of two opposing corners thereof and detour elements at the other opposing corners.

A tenth aspect of the invention is a monitoring apparatus of the above-mentioned ninth aspect of the invention, wherein said rectangular antenna element has a substantially square shape, while one side thereof has a length of substantially ⅓ of a wavelength of an operating frequency, and while each of said detour elements has a length of substantially ¼ of the wavelength of the operating frequency.

An eleventh aspect of the invention is a monitoring apparatus of the above-mentioned seventh or ninth aspect of the invention, wherein said rectangular antenna element is a slot loop antenna having a slot section where a conductor on a conductor face of a dielectric substrate is removed in a rectangular shape, while said detour elements are detour slot parts located at a pair of opposing corners of said slot section, and wherein each of the other pair of opposing corners of said slot section receives power fed by electromagnetic coupling from an end of one of microstrip lines formed on a surface opposite to the conductor face of said dielectric substrate, while the other end of one of said microstrip lines is said first power feed section, and while the other end of the other of said microstrip lines is said second power feed section.

A twelfth aspect of the invention is a monitoring apparatus of the above-mentioned eleventh aspect of the invention, wherein the surface opposite to the conductor face of said dielectric substrate faces said reflector plate.

A thirteenth aspect of the invention is a monitoring apparatus of the above-mentioned first aspect of the invention, further comprising a first target position determination section for determining a distance to said target on the basis of the signal transmitted to said receiving section, then determining a direction toward said target on the basis of a value obtained when a difference of amplitudes of two signals among a plurality of signals corresponding to a plurality of radio waves received from said different beam directions is normalized by a sum of the amplitudes of said two signals, and thereby determining a position of said target on the basis of said distance and said direction toward said target.

A fourteenth aspect of the invention is a monitoring apparatus of the above-mentioned first aspect of the invention, wherein said monitoring apparatus is installed on a vehicle.

A fifteenth aspect of the invention is a monitoring apparatus of the above-mentioned fourteenth invention, further comprising a running information storing section for storing running state information of said vehicle, wherein said receiving antenna section includes a first power feed section and a second power feed section, and wherein on the basis of said running state information stored in said running information storing section, said beam switching instrument performs switching such that power is fed to either said first power feed section or said second power feed section.

A sixteenth aspect of the invention is a monitoring apparatus of the above-mentioned fourteenth aspect of the invention, wherein at least said transmission antenna section and said receiving antenna section are provided in a front central part and/or a rear central part of said vehicle, and wherein among said different beam directions, one is directed leftward of said vehicle, while another one is directed rightward of said vehicle.

A seventeenth aspect of the invention is a monitoring apparatus of the above-mentioned fourteenth aspect of the invention, wherein at least said transmission antenna section and said receiving antenna section are provided within a side mirror of said vehicle, and wherein among said different beam directions, one is directed forward of said vehicle, while another one is directed rearward of said vehicle.

An eighteenth aspect of the invention is a surroundings monitoring system wherein a plurality of said monitoring apparatuses of the above-mentioned first or fourteenth aspect of the invention are provided and aligned so that a larger region becomes a monitoring area in comparison with the case that said monitoring apparatus is employed in standalone.

A nineteenth aspect of the invention is a surroundings monitoring system of the above-mentioned eighteenth aspect of the invention, wherein a timing that all of a plurality of said monitoring apparatuses monitor the same predetermined side and a timing that all of a plurality of said monitoring apparatuses monitor the side opposite to said same predetermined side are switched and controlled in time sharing.

A twentieth aspect of the invention is a surroundings monitoring system of the above-mentioned aspect of the eighteenth invention, comprising a second target position determination section for determining a position of a target on the basis of a distance from one monitoring apparatus, among a plurality of said monitoring apparatuses having been aligned, to said target determined by said one monitoring apparatus and a distance from another monitoring apparatus to said target determined by said another monitoring apparatus arranged distant from said one monitoring apparatus.

A twenty-first aspect of the invention is a vehicle carrying the surroundings monitoring system of the above-mentioned aspect of the eighteenth, nineteenth, or the twentieth invention.

A twenty-second aspect of the invention is a monitoring control method in a vehicle-installed monitoring apparatus for sending out a radio wave, then receiving a radio wave generated by reflection of the radio wave, and thereby detecting a target including a material body and/or a human body, wherein said method includes the step of determining which monitoring area among a plurality of monitoring areas that can be monitored when a beam direction of the radio wave is switched should be activated at which timing on the basis of running state information of said vehicle, and of thereby controlling the monitoring area.

A twenty-third aspect of the invention is a monitoring control method of the above-mentioned twenty-second aspect of the invention, wherein said step of controlling the monitoring area includes the steps of:

individually opening or short-circuiting each of a plurality of switching elements of a receiving antenna section including one feed element and a plurality of non-feed elements each having a switching element in a central part thereof, and thereby setting the beam direction of the received radio wave to be a predetermined direction; and switching the open or short circuit of a plurality of said switching elements, and thereby setting the beam direction of the received radio wave to be a direction different from said predetermined direction.

A twenty-fourth aspect of the invention is a program of causing a computer to execute the step of determining which monitoring area among a plurality of monitoring areas that can be monitored when a beam direction of the radio wave is switched should be activated at which timing on the basis of running state information of said vehicle, and of thereby controlling the monitoring area, in the monitoring control method of the above-mentioned twenty-second aspect of the invention.

A twenty-fifth aspect of the invention is a recording medium which carries the program of the above-mentioned twenty-fourth aspect of the invention and which can be processed by a computer.

A monitoring apparatus has an effect that a wider (angular) range of vehicle surroundings can be monitored using a small number of monitoring apparatuses, and hence is useful as a surroundings monitoring apparatus for a car or the like. Further, the apparatus maybe installed inside or outside a building instead of a car. In this case, the apparatus is applicable in security use, counting of the number of entering and exiting persons, and the like.

The invention claimed is:

1. A monitoring apparatus for being installed on a vehicle, sending out a radio wave, then receiving a radio wave generated by reflection of the radio wave, and thereby detecting a target including a material body and/or a human body, said apparatus comprising:
   a transmission antenna section for sending out from a common location a radio wave beam in different angular directions within an angular range of interest, wherein the beam has an angular range which is narrower than the angular range of interest;
   a receiving antenna section for receiving in each different beam direction the radio wave transmitted by said transmission antenna section and then reflected by said target;
   a transmission section of transmitting for said transmission antenna section a signal to be sent out as said radio wave;
   a receiving section to which the radio wave received by said receiving antenna section is transmitted as a signal from said receiving antenna section;
   beam switching instrument which switches the beam direction sequentially through the angular range of interest when said receiving antenna section receives said radio wave in said each different beam direction, in order to detect the target within the angular range of interest, and the beams are sequentially switched in directions that ensure that the angular range of each beam does not overlap substantially; and
   a running information storing section for storing running state information of said vehicle, wherein
   said receiving antenna section includes a first power feed section and a second power feed section, and wherein
   on the basis of said running state information stored in said running information storing section, said beam switching instrument performs switching such that power is fed to either said first power feed section or said second power feed section.

2. A monitoring apparatus according to claim 1, wherein when said transmission antenna section sends out said radio wave in different beam directions, said beam switching instrument sequentially switches the beam direction of the transmitted radio wave to control a monitoring area.

3. A monitoring apparatus according to claim 2, comprising transmission and reception switching instrument which switches a signal transmitted from said transmission section and a signal transmitted to said receiving section, wherein
   said receiving antenna section serves also as said transmission antenna section, while transmission or reception of the radio wave is switched by said transmission and reception switching instrument.

4. A monitoring apparatus according to claim 1, wherein said receiving antenna section includes a reflector plate and a rectangular antenna element parallel to said reflector plate, and wherein
   said rectangular antenna element retains said first power feed section and said second power feed section at a pair of two opposing corners thereof and detour elements at the other opposing corners.

5. A monitoring apparatus according to claim 4, wherein said rectangular antenna element has a substantially square shape, while one side thereof has a length of substantially ⅓ of a wavelength of an operating frequency, and while each of said detour elements has a length of substantially ¼ of the wavelength of the operating frequency.

6. A monitoring apparatus according to claim 4, wherein
   said rectangular antenna element is a slot loop antenna having a slot section where a conductor on a conductor face of a dielectric substrate is removed in a rectangular shape, while said detour elements are detour slot parts located at a pair of opposing corners of said slot section, and wherein
   each of the other pair of opposing corners of said slot section receives power fed by electromagnetic coupling from an end of one of microstrip lines formed on a surface opposite to the conductor face of said dielectric substrate, while the other end of one of said microstrip lines is said first power feed section, and while the other end of the other of said microstrip lines is said second power feed section.

7. A monitoring apparatus according to claim 6, wherein the surface opposite to the conductor face of said dielectric substrate faces said reflector plate.

8. A monitoring apparatus according to claim 1, further comprising a first target position determination section for determining a distance to said target on the basis of the signal transmitted to said receiving section, then determining a direction toward said target on the basis of a value obtained when a difference of amplitudes of two signals among a plurality of signals corresponding to a plurality of radio waves received from said different beam directions is normalized by a sum of the amplitudes of said two signals, to determine a position of said target on the basis of said distance and said direction toward said target.

9. A monitoring apparatus according to claim 1, wherein
   at least said transmission antenna section and said receiving antenna section are provided in a front central part and/or a rear central part of said vehicle, and wherein
   among said different beam directions, one is directed leftward of said vehicle, while another one is directed rightward of said vehicle.

10. A monitoring apparatus according to claim 1, wherein
    at least said transmission antenna section and said receiving antenna section are provided within a side mirror of said vehicle, and wherein
    among said different beam directions, one is directed forward of said vehicle, while another one is directed rearward of said vehicle.

11. A surroundings monitoring system wherein a plurality of said monitoring apparatuses according to claim 1 are provided and aligned so that a larger region becomes a monitoring area in comparison with the case that said monitoring apparatus is employed in stand-alone.

12. A surroundings monitoring system according to claim 11, wherein a timing that all of a plurality of said monitoring apparatuses monitor the same predetermined side and a timing that all of a plurality of said monitoring apparatuses monitor the side opposite to said same predetermined side are switched and controlled in time sharing.

13. A surroundings monitoring system according to claim 11, comprising a target position determination section for determining a position of a target on the basis of a distance from one monitoring apparatus, among a plurality of said monitoring apparatuses having been aligned, to said target determined by said one monitoring apparatus and a distance from another monitoring apparatus to said target determined by said another monitoring apparatus arranged distant from said one monitoring apparatus.

14. A monitoring control method in a vehicle-installed monitoring apparatus of sending out a radio wave, then receiving a radio wave generated by reflection of the radio wave, and thereby detecting a target including a material body and/or a human body, said method includes the steps of:

transmitting from a common location a radio wave beam in different angular directions within an angular range of interest, wherein the beam has an angular range which is narrower than the angular range of interest;

switching the beam direction sequentially through the angular range of interest when said radio wave is received in said each different beam direction, in order to detect the target within the angular range of interest, and the beams are sequentially switched in directions that ensure that the angular range of each beam does not overlap substantially; and determining which monitoring area among a plurality of monitoring areas that can be monitored when a beam direction of the radio wave is switched should be activated at which timing on the basis of running state information of said vehicle, to control the monitoring area.

15. A surroundings monitoring system according to claim 11, wherein said monitoring apparatuses are installed in both side door mirrors of said vehicle, and among said different beam directions of said monitoring apparatus of said each side door mirror, one is directed forward of said vehicle, while another one is directed rearward to said vehicle.

16. A surroundings monitoring system according to claim 15, wherein when said running state information of said vehicle indicates that said vehicle is running at a low speed, said beam switching instrument switches the beam directions to monitor the forward directions of said vehicle, and when said running state information of said vehicle indicates that said vehicle is running at a high speed, said beam switching instrument switches the beam directions to monitor the rearward directions of said vehicle.

17. A surroundings monitoring system according to claim 15, wherein when said running state information of said vehicle indicates that said vehicle moves forward in a state that the steering wheel is turned left, said beam switching instrument switches the beam directions of a left side of said vehicle to monitor said forward direction and said rearward direction alternately, and sets the beam direction of a right side of said vehicle to monitor said forward direction, and when said running state information of said vehicle indicates that said vehicle moves forward in a state that the steering wheel is turned right, said beam switching instrument switches the beam directions of a right side of said vehicle to monitor said forward direction and said rearward direction alternately, and sets the beam direction of a left side of said vehicle to monitor said forward direction.

18. A surroundings monitoring system according to claim 11, wherein said monitoring apparatuses are installed at the corners of said vehicle, among said different beam directions of said monitoring apparatus installed at a left forward corner of said vehicle, one is directed forward left side of said vehicle, while another one is directed left forward side of said vehicle, among said different beam directions of said monitoring apparatus installed at a right forward corner of said vehicle, one is directed forward right side of said vehicle, while another one is directed right forward side of said vehicle, among said different beam directions of said monitoring apparatus installed at a right rearward corner of said vehicle, one is directed rearward right side of said vehicle, while another one is directed right rearward side of said vehicle, and among said different beam directions of said monitoring apparatus installed at a left rearward corner of said vehicle, one is directed rearward left side of said vehicle, while another one is directed left rearward side of said vehicle.

19. A surroundings monitoring system according to claim 18, wherein when said running state information of said vehicle indicates that said vehicle is running at a high speed, (a) said beam switching instrument of said monitoring apparatus installed at a left forward corner of said vehicle sets the beam direction to monitor the forward left side of said vehicle, (b) said beam switching instrument of said monitoring apparatus installed at a right forward corner of said vehicle sets the beam direction to monitor the forward right side of said vehicle, (c) said beam switching instrument of said monitoring apparatus installed at a right rearward corner of said vehicle sets the beam directions to monitor the rearward right side of said vehicle, and (d) said beam switching instrument of said monitoring apparatus installed at a left rearward corner of said vehicle sets the beam direction to monitor the rearward left side of said vehicle.

20. A surroundings monitoring system according to claim 18, wherein when said running state information of said vehicle indicates that said vehicle is starting, (a) said beam switching instrument of said monitoring apparatus installed at a left forward corner of said vehicle sets the beam direction to monitor the forward left side of said vehicle, simultaneously said beam switching instrument of said monitoring apparatus installed at a right forward corner of said vehicle sets the beam direction to monitor the right forward side of said vehicle, and afterward (b) said beam switching instrument of said monitoring apparatus installed at a left forward corner of said vehicle switches the beam direction to monitor the left forward side of said vehicle, simultaneously said beam switching instrument of said monitoring apparatus installed at a right forward corner of said vehicle switches the beam direction to monitor the forward right side of said vehicle.

21. A monitoring apparatus for being installed on a vehicle, sending out a radio wave, then receiving a radio wave generated by reflection of the radio wave, and thereby detecting a target including a material body and/or a human body, said apparatus comprising:

a transmission antenna section for sending out a radio wave beam within an angular range of interest;

a receiving antenna section for receiving in each different beam direction the radio wave transmitted by said transmission antenna section and then reflected by said target;

a transmission section of transmitting for said transmission antenna section a signal to be sent out as said radio wave;

a receiving section to which the radio wave received by said receiving antenna section is transmitted as a signal from said receiving antenna section;

a beam switching instrument which switches the beam direction sequentially through the angular range of interest when said receiving antenna section receives said radio wave in said each different beam direction, in order to detect the target within the angular range of interest, and the beams are sequentially switched in directions that ensure that the angular range of each beam does not overlap substantially; and a running information storing section for storing running state information of said vehicle, wherein said angular range of interest of said transmission antenna section includes all of each monitoring area in said each different beam direction of said receiving antenna section, said receiving antenna section includes a first power feed section and a second power feed section, and wherein on the basis of said running state information stored in said running information storing section, said beam switching instrument performs switching such that power is fed to either said first power feed section or said section power feed section.

22. A monitoring apparatus according to claim 21, wherein said receiving antenna section includes a reflector plate and a rectangular antenna element parallel to said reflector plate, and wherein said rectangular antenna element retains said first power feed section and said second power feed section at a pair of two opposing corners thereof and detour elements at the other opposing corners.

23. A monitoring apparatus according to claim 22, wherein said rectangular antenna element has a substantially square shape, while one side thereof has a length of substantially ⅓ of a wavelength of an operating frequency, and while each of said detour elements has a length of substantially ¼ of the wavelength of the operating frequency.

24. A monitoring apparatus according to claim 22, wherein said rectangular antenna element is a slot loop antenna having a slot section where a conductor on a conductor face of a dielectric substrate is removed in a rectangular shape, while said detour elements are detour slot parts located at a pair of opposing corners of said slot section, and wherein each of the other pair of opposing corners of said slot section receives power fed by electromagnetic coupling from an end of one of microstrip lines formed on a surface opposite to the conductor face of said dielectric substrate, while the other end of one of said microstrip lines is said first power feed section, and while the other end of the other of said microstrip lines is said second power feed section.

25. A monitoring apparatus according to claim 24, wherein the surface opposite to the conductor face of said dielectric substrate faces said reflector plate.

26. A monitoring apparatus according to claim 21, further comprising a first target position determination section for determining a distance to said target on the basis of the signal transmitted to said receiving section, then determining a direction toward said target on the basis of a value obtained when a difference of amplitudes of two signals among a plurality of signals corresponding to a plurality of radio waves received from said different beam directions is normalized by a sum of the amplitudes of said two signals, to determine a position of said target on the basis of said distance and said direction toward said target.

27. A monitoring apparatus according to claim 21, wherein at least said transmission antenna section and said receiving antenna section are provided in a front central part and/or a rear central part of said vehicle, and wherein among said different beam directions, one is directed leftward of said vehicle, while another one is directed rightward of said vehicle.

28. A monitoring apparatus according to claim 21, wherein at least said transmission antenna section and said receiving antenna section are provided within a side mirror of said vehicle, and wherein among said different beam directions, one is directed forward of said vehicle, while another one is directed rearward of said vehicle.

29. A surroundings monitoring system wherein a plurality of said monitoring apparatuses according to claim 21 are provided and aligned so that a larger region becomes a monitoring area in comparison with the case that said monitoring apparatus is employed in stand-alone.

30. A surroundings monitoring system according to claim 29, wherein a timing that all of a plurality of said monitoring apparatuses monitor the same predetermined side and a timing that all of a plurality of said monitoring apparatuses monitor the side opposite to said same predetermined side are switched and controlled in time sharing.

31. A surroundings monitoring system according to claim 29, comprising a target position determination section for determining a position of a target on the basis of a distance from one monitoring apparatus, among a plurality of said monitoring apparatuses having been aligned, to said target determined by said one monitoring apparatus and a distance from another monitoring apparatus to said target determined by said another monitoring apparatus arranged distant from said one monitoring apparatus.

32. A monitoring control method in a vehicle-installed monitoring apparatus of sending out a radio wave, then receiving a radio wave generated by reflection of the radio wave, and thereby detecting a target including a material body and/or a human body, said method comprising:

a step of determining which monitoring area among a plurality of monitoring areas that can be monitored when a beam direction of the radio wave is switched should be activated at which timing on the basis of running state information of said vehicle, to control the monitoring area;

a transmission step of sending out the radio wave beam within an angular range of interest;

a receiving step of receiving in each different beam direction the radio wave transmitted by said transmission step and then reflected by said target; and a beam switching step which switches the beam direction sequentially through the angular range of interest when said receiving step receives said radio wave in said each different beam direction, in order to detect the target within the angular range of interest, and the beams are sequentially switched in directions that ensure that the angular range of each beam does not overlap substantially; and a step for storing running state information of said vehicle, wherein said angular range of interest includes all of each monitoring area in said each different beam direction of said receiving step, and wherein on the basis of said running state information, said beam switching step performs switching such that power is fed to either a first power feed section or a second power feed section, said first and second power feed sections controlling a receiving antenna used in the receiving step.

* * * * *